(12) United States Patent
Imajo

(10) Patent No.: US 6,337,754 B1
(45) Date of Patent: Jan. 8, 2002

(54) OPTICAL CONVERSION RELAY AMPLIFICATION SYSTEM

(75) Inventor: Yoshihiro Imajo, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/192,539

(22) Filed: Nov. 17, 1998

(30) Foreign Application Priority Data

Nov. 20, 1997 (JP) .............................................. 9-320040
Nov. 9, 1998 (JP) ........................................... 10-317479

(51) Int. Cl.$^7$ .............................................. H04B 10/02

(52) U.S. Cl. ....................... 359/174; 359/176; 359/177; 359/179; 359/172; 359/145; 455/9; 455/14; 455/20; 455/22; 455/23; 455/410

(58) Field of Search ................................ 359/174, 177, 359/179, 176, 172, 145; 455/9, 14, 20, 22, 23, 410

(56) References Cited

U.S. PATENT DOCUMENTS

| | | | | |
|---|---|---|---|---|
| 5,278,690 A | * | 1/1994 | Veil-Coleiro | 359/152 |
| 5,296,957 A | * | 3/1994 | Takahashi et al. | 359/177 |
| 5,339,184 A | * | 8/1994 | Tang | 359/124 |
| 5,615,034 A | * | 3/1997 | Hori | 359/110 |
| 5,689,355 A | * | 11/1997 | Okubo et al. | 359/179 |
| 5,812,296 A | * | 9/1998 | Tarusawa et al. | 359/173 |
| 5,838,474 A | * | 11/1998 | Stilling | 359/173 |
| 5,875,046 A | * | 2/1999 | Tomooka et al. | 359/174 |
| 5,969,837 A | * | 10/1999 | Farber et al. | 359/132 |
| 5,982,854 A | * | 11/1999 | Ehreth | 379/56.2 |

FOREIGN PATENT DOCUMENTS

| | | |
|---|---|---|
| JP | 6-153255 | 5/1994 |
| JP | 9-130322 | 5/1997 |

OTHER PUBLICATIONS

Kuganuma et al, "A tunnel booster 1.5 Ghz digital mobile communications", NTT DeCoMo Technical Journal, vol. 2, No. 2, 1994.

Sanada et al, "An optical transmission system for wireless base stations", National Technical Report, vol. 39, No. 4, 1993.

(List continued on next page.)

*Primary Examiner*—Leslie Pascal
*Assistant Examiner*—Hanh Phan
(74) *Attorney, Agent, or Firm*—Jacobson Holman, PLLC

(57) ABSTRACT

The present invention provides an economic optical conversion relay amplification system avoiding a beat noise in an uplink line of an optical transmission line of multibranching and multinode multiplexing type.

In the optical conversion relay amplification system of the present invention, a downlink radio signal is converted to an optical signal in an electric/optical converter the fixed central station, and transmitted via a downlink optical fiber line, divided in a downlink optical signal in an optical branching device of a fixed relay station, subjected to optical multiplex, subjected to optical multiplexing with an uplink optical signal transmitted from a lower rank fixed relay station by an optical multiplexer, and converted to an electric signal by an optical—electric converter, a down link signal component is contained in the electric signal is sent to a portable apparatus via an antenna, the uplink signal component is subjected to power multiplexing with an uplink signal transmitted from the portable apparatus by a power multiplexer, converted to an optical signal by an electric—optical converter to transmit via an uplink optical fiber line, and again converted to an electric signal by the optical/electric converter of the fixed central station to send as an uplink radio signal.

13 Claims, 8 Drawing Sheets

OTHER PUBLICATIONS

K. Morita et al, "The new generation of wireless communications based on . . .", IEICE Trans. Comm., vol. E76–B, No. 9, 1993.

Taresawa et al, "A single core, mutibranching type optical fiber link for mobile . . .", IEICE Tech. Rep., RCS97–70, 1994.

Hukuie et al, "Constitution of a multibranching optical transmission . . .", IEICE Communications Society Meeting, B–492, 1996.

Domon et al, "A proposal of an optical multiaccess using the subcarrier . . .", IEICE Tech. Rep., OCS93–99, 1994.

* cited by examiner

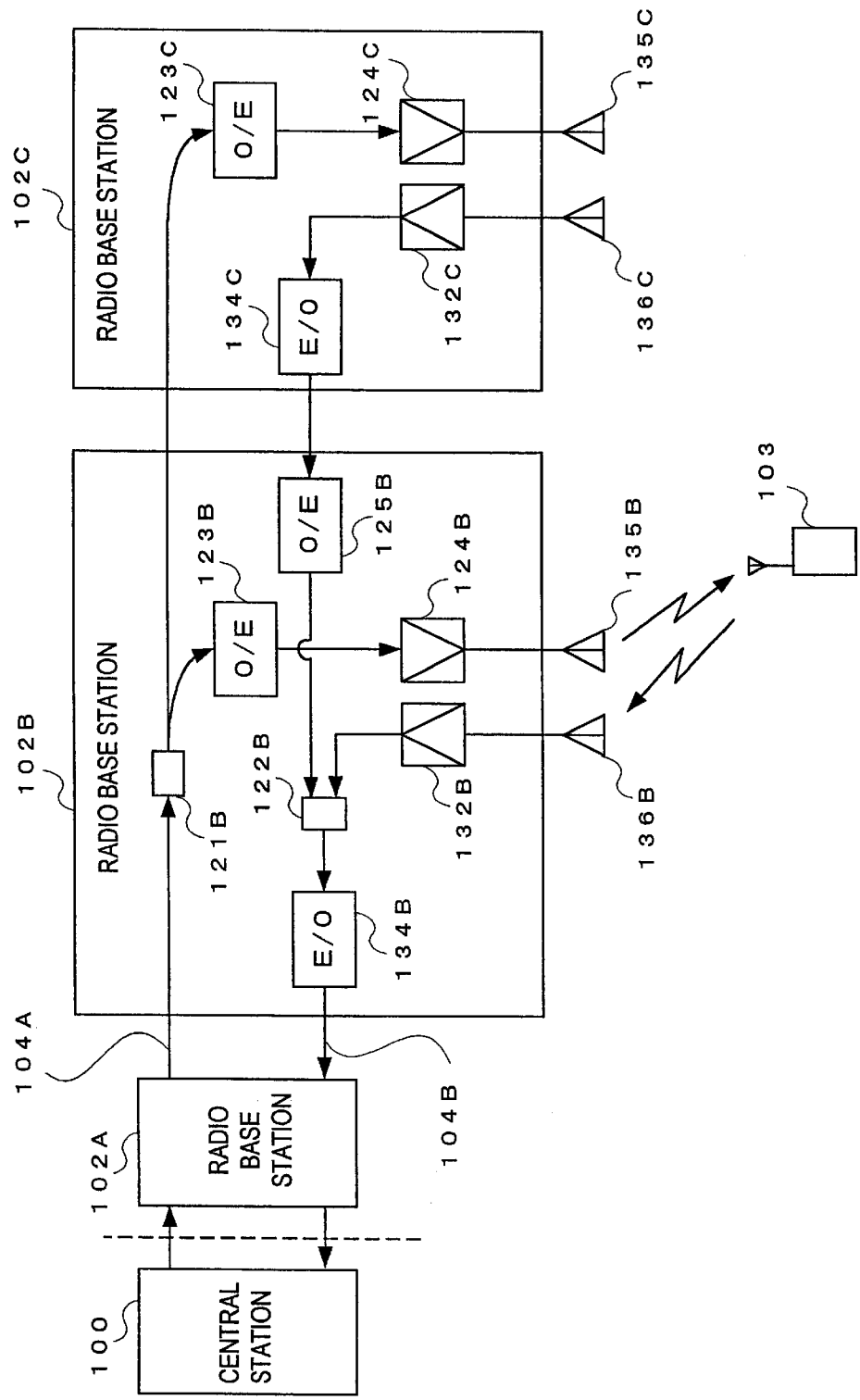

OPTICAL CONVERSION RELAY AMPLIFICATION SYSTEM

BACKGROUND OF THE INVENTION

1. Field of the Invention

The present invention relates to an optical conversion relay amplification system for use as a relay amplification system to cover a dead spot of mobile communications, particularly relates to an optical conversion relay amplification system achievable of economic constitution avoiding a beat noise.

2. Description of the Related Art

Public mobile communications systems (hereafter referred to as mobile communications systems) such as car phone, portable phone system, PHS, paging system, etc. have a base station of the mobile communications (hereafter, base station) linked to a network of the higher rank than public networks, etc. (PSTN and ISDN) by a wire to allow the base station to communicate with mobile stations such as portable phones by wireless systems.

The communicable area (cover area) of the base station by wireless systems is exemplified by some kilometers to some ten kilometers in car phone and portable phone systems and some hundred meters in PHS. In addition, so-called "cellular system" is applied to locate base stations in cover areas like cells in order to keep wider areas effectively using frequencies.

Further, to solve the problem of frequency resource according to an increased demand of radio waves, 1.5 GHz frequency band has been newly assigned to car/portable phone systems for use in addition to the conventional 800 MHz band and 1.9 GHz frequency band has been assigned to PHS for use. Furthermore, 2 GHz band is probably assigned to the portable phone of the next generation. All these band changes to high frequency bands have been carried out for mobile communications.

In these mobile communications systems using the cellular system, generally, wireless communications are done in high quality on outdoor ground, etc. However, even in a cover area of a base station, a radio wave difficultly reaches the inside of a tunnel, an underground shopping center, a basement of a building, and stories above ground of a big building, and thus, any auxiliary means are required to communicate with mobile wireless terminals in these sites by wireless systems.

These areas are named "dead spots". The dead spot generally appears in radio wave wireless communications not only of mobile communications systems, but also of such as official radios exemplified by police radio, fire radio, and train radio, TV broadcast, and radio broadcast.

As auxiliary means to allow wireless communications in these dead spots, an apparatus named "relay amplification apparatus is generally used".

The first antenna is located in a site capable of high quality wireless communications with a base station (a broadcast station in broadcasting) and the second antenna is located in a dead spot to amplify a high frequency signal arrived in the first antenna, transmit to the second antenna located in the dead spot by a wire, and radiate the high frequency signal amplified via the second antenna.

By such steps, downlink communications from the base station to the mobile station are kept. Besides, wireless communications in the dead spot become possible by that communications of a downlink line from the base station to the mobile station are established, and also by that in uplink communications from the mobile station to the base station, the high frequency signal radiated by the mobile station is caught by the second antenna to amplify and transmitted to the first antenna with a wire, and the amplified high frequency signal is radiated via the first antenna to output for transmission to the base station.

In addition, on the background of the popularized, wired, high quality communications networks of higher rank such as ISDN, there is a plan that a radio modem is equipped for the dead spot, e.g., underground shopping center where communications have a particularly large demand, directly connected to higher rank network such as ISDN by a wire.

Such radio modem modulates a high frequency signal by a signal inputted from the higher rank network, distributes the high frequency signal from the radio modem to an antenna (said second antenna) located in the dead spot, receives the frequency signal through the antenna, and demodulates the signal from the mobile station to output to the higher rank network.

The conventional relay amplification systems are specifically exemplified by a method in which in a dead spot such as tunnel, a leaky coaxial cable suitable to achieve a linear service area is used as the second antenna to link to the first antenna with a high frequency coaxial cable, and a method in which the second antenna is located in various sites to link to the first antenna with a high frequency coaxial cable.

However, a connection distance between the first antenna and the second antenna requires some kilometers on the situation. In this case, an attenuation (transmission loss) occurs as a problem in the high frequency coaxial cable. Particularly in latest years, frequencies assigned to mobile communications are moved to higher bands to require coaxial cables with a large diameter resulting in a problem of difficulty of laying construction.

Thus, to avoid transmission loss, the optical conversion relay amplification system has been proposed and partially practiced using analog optical fiber transmission technology in replacement to conventionally used the high frequency coaxial cable and leaky coaxial cable having a function as an antenna.

The technical situations of these optical conversions have been detailedly described in reference 1: Kuganuma et al., "A tunnel booster 1.5 GHz digital mobile communications", NTT DoCoMo technical Journal, Vol. 2, No. 2 (1994), for example, for relay system, and also for example, reference 2: Sanada et al., "An optical transmission system for wireless base stations", National Technical report, Vol. 39, No. 4 (1993) for optical transmission system to link to the system of a base station.

Besides, a detailed description has been given in the following general review about the application of transmission technology using an analog optical fiber for mobile communications: reference 3, Morita, K., et al., "The new generation of wireless communications based on fiber-radio technologies", IEICE Trans. Comm., Vol. E76-B, No. 9 (1993), etc.

On the other hand, the following two main systems are conventional to accomplish these analog optical fiber transmission systems in a structure of optical transmission line: a star distribution connection used for point-to-multipoint connection to connect an optical transmitter/receiver of the first antenna side with an optical transmitter/receiver of the second antenna side for the downlink line from the base station of the mobile communications (simply, base station) with the mobile station (portable machine); on the contrary, transmission by connecting both optical transmitters/ receivers as point-to-point connection in the uplink line from the portable machine to the mobile base station.

However, this connection system requires many optical fiber conductors. Therefore, A multibranching optical transmission system has been proposed to make the system economic by reducing the required optical fiber conductors.

This means that the number of optical fiber conductor is reduced to one for the downlink to distribute optical signals in a site requiring the distribution of the optical signal by using a point-to-two point optical branching device. The uplink, as well, transmits an optical signal from respective sites through a single optical fiber by multiplex using a point-to-two point optical multiplexer.

By this process, in the uplink, the optical fiber as transmission line is one in number and, in addition, an optical signal multiplexed by a single photo-detector is collectively received to make the scale of a photo-detector circuit small as an advantage.

As a specific example appeared in Japanese Published Unexamined Patent Application No.153255/94, a system has been described as that radio signals received by a plurality of antennae—corresponding to the second antenna/e—put in a tunnel is converted to optical signals with different wavelengths keeping enough difference among E/O converters making pairs with respective antennae, respective optical signals are connected with optical couplers to transmit to objective sites using a single optical fiber to convert to electric signals using O/E converters for supplying to radio receiver.

In Japanese Published Unexamined Patent Application No.130322/97, a technology has been described that relay is carried out by connecting a ground relay station having the first antenna with a relay station in a dead spot having a leaky coaxial cable—corresponding to said second antenna—laid in a tunnel or an underground shopping center using an optical fiber.

As specific action, a radio signal from the base station of a mobile communication is received by a ground relay station via the first antenna, the high frequency electric signal thereof is converted to an optical signal to send via an optical fiber, the optical signal received by the relay station in the dead spot is converted to a high frequency electric signal and finally send through the leaky coaxial cable to the mobile station.

On the contrary, a radio signal sent from the mobile station is received by the leaky coaxial cable, the high frequency electric signal is converted to an optical signal in the relay station located in the dead spot to send via an optical fiber, the optical signal received by the ground relay station is converted to the high frequency electric signal to send to the base station of the mobile communications from the first antenna resulting in relay.

Particularly, as an example considering impossible area coverage caused by attenuation in a single leaky coaxial cable in a very long tunnel, etc., a technology has been described as that a plurality of the leaky coaxial cables is laid, a plurality of relay stations is established in the dead spot to service respective areas, an optical fiber is made as an optical transmission line of a single core multibranch type using a point-to-two points optical branching device/optical joint located near relay stations in respective dead spots.

As in said conventional examples 1 and 2, the use of the optical branching device/optical joint requires that branching ratio of the optical branching device in the downlink line is determined on situation in a system using a single optical fiber for an optical transmission line of the single core multibranch type.

On the other hand, in the uplink as like as the downlink, the multiplexing ratio of the optical multiplexer should be determined on situation. Besides, it should be considered that a beat noise caused by frequency difference among a plurality of optical signals multiplexed as electromagnetic waves should not affect the frequency band of the objective high frequency signal.

Said optical branching device and optical multiplexer can be made by using an optical coupler of fiber fusion type, for example. A single optical coupler can be used for both branching and multiplexing; a marketed optical coupler with branching ratio (multiplexing ratio) of each 5% class from 50%: 50% (power ratio) to 5% to 95% can be easily used.

Concerning methods to avoid a beat noise in the uplink, as shown in the first method of reference 4, it is the method proposed that a beat noise is detected positively to control to prevent abutting of emitting wavelengths (i.e., frequency) of a light emission diode to avoid the effect of the beat noise.

Reference 4: Taresawa et al., "a single core, multibranching type optical fiber link for mobile communications employing automated frequency offset control", IECIE Tech. Rep., RCS97- 70 (1994.)

However, in the first method, there are problems that more numbers of wavelengths cannot be used, light source for transmission is expensive, the optical multiplexing loss is high, and maintenance is difficult.

On the other hand, as the second method to avoid the beat noise, the following method has been proposed: no positive control of wavelength is carried out and the wavelength of a semiconductor laser—a light source of the optical signal—is selected to multiplex previously. According to the experiment of the inventors of the second method, a semiconductor laser of multilongitudinal mode oscillation, and in the optical signal of multipoint multiplexing using Fabry-Perot type laser as a light source of which condition of avoiding the beat noise is more strict in comparison with that of DFB (Distributed FeedBack) laser, a difference around 10 nm between central wavelengths is required to inhibit an effect on a frequency band of portable phones; the multiplex of 3–4 per single fiber is a limit in consideration of economic system, easy availability of the light source.

The reference 5 presents the proposal of application of said second method to the mobile communications systems.

Reference 5: Hukuie et al., "Constitution of a multibranching optical transmission system for mobile the communications", 1996 IECIE Communications Society Meeting, B-492.

Avoiding the beat noise in the uplink is the most crucial technical problem in said high frequency signal transmission systems by analog optical modulation using the optical transmission lines of said multibranching and multinode multiplexing type.

Thus, Reference 6 proposed an optical multiaccess using a subcarrier relay node multiplexing system, in which any beat noise does not occur, as the third method to prevent a problem of optical beat noise caused by the optical multiplexing in the uplink.

Reference 6: Domon et al., "A proposal of an optical multiaccess using the subcarrier relay node multiplexing system", IECIE Tech. Rep., OCS93-99 (1994.)

The outline of said system is: an optical signal is once converted to electric signal in respective local nodes to multiplex electrically frequencies of new subcarriers followed by conversion to an optical signal to send to the optical transmission line.

The optical signal transmitted by multiplexing electrically the new subcarriers in respective local nodes one after another applying said method is received by an optical receiver in a center node to convert to an electric signal and a signal sent from a local node can be selected with a tuner etc.

As a specific example of said system, an optical network for relay and amplification using the optical multiaccess by the subcarrier relay node multiplexing system has been proposed in Japanese Published Unexamined Patent Application No. 191478/96. This system is herewith explained as a conventional optical conversion relay amplification system with reference to FIG. 8. The FIG. 8 is the diagrammatic illustration of the conventional optical conversion relay amplification system and the optical networks using the system.

The conventional optical conversion relay amplification system is, as shown in the FIG. 8, mainly composed of a central station 100, a mobile terminal station 103, an intermediate radio base station 102A and 102B, an end radio base station 102C, and a downlink optical fiber line 104A and an uplink optical fiber line 104B connecting the central station 100 and respective radio base stations 102.

In the central station 100, a downlink signal is modulated to send to the mobile terminal 103, converted to an optical signal to send to the downlink optical fiber line 104A; on the contrary, the uplink optical signal sent from the mobile terminal 103 to transmit is received from the uplink optical fiber line 104B to convert to a radio signal followed by demodulation.

The intermediate radio base station 102B is composed of an optical demultiplexer 121B demultiplexing the downlink optical signal from the downlink optical fiber line 104A, an optical receiver 123B converting the optical signal demultiplexed to radio signal, an amplifier 124B amplifying the radio signal, an antenna 135B sending the radio signal, an antenna 136B receiving the radio signal, an amplifier 132B amplifying the received signal, an optical receiver 125B converting the optical signal transmitted from a lower rank radio base station to a high frequency signal, a multiplexer 122B multiplexing the received signal amplified by the amplifier 132B with the high frequency signal from optical receiver 125B, and an optical transmitter 134B converting the multiplexed signal to an optical signal to send to the uplink optical fiber line 104B.

The intermediate radio base station 102A has the same constitution.

The end radio base station 102C has the constitution in which a function of demultiplexing optical signals in the downlink line and an optical relaying function in the uplink line have been removed from the constitution of the intermediate radio base station 102B, and is composed of an optical receiver 123C converting an optical signal from the downlink optical fiber line 104A to a radio signal, an amplifier 124C amplifying the radio signal, an antenna 135C sending the radio signal, an antenna 136C receiving the radio signal, an amplifier 132C amplifying the received signal, and an optical transmitter 134C converting the received amplified signal to an optical signal to send to the uplink optical fiber line 104B.

Further in the action of the conventional optical conversion relay amplification system, a downlink signal is converted to an optical signal in the central station 100 to send through the downlink optical fiber line 104A, partially demultiplexed by the demultiplexer 121B in the radio base station 102B (same in the radio base station 102A), converted to a radio signal by the optical receiver 123B, amplified by the amplifier 124B, and transmitted from the antenna 136B to the mobile terminal station 103B.

Furthermore, the optical signal transmitted from a lower rank radio base station (for example, radio base station 102C) to the uplink optical fiber line 104B is converted to a high frequency signal by the optical receiver 125B and inputted into the multiplexer 122B.

On the other hand, a radio signal sent from the mobile terminal 103 is received by the antenna 136B, amplified by the amplifier 132B, inputted into the multiplexer 122B, multiplexed with the high frequency arrived from said lower rank radio base station, subsequently, converted to an optical signal by the optical transmitter 134B and sent to the uplink optical fiber line 104B, and finally, converted to a radio signal by the central station 100.

Although the beat noise occurring in the uplink line can be avoided in said conventional optical conversion relay amplification system, there is a problem that the optical receiver having same performance is required by respective uplink and downlink lines resulting in an increased circuit size uneconomical.

SUMMARY OF THE INVENTION

The purpose of the present invention is to provide an optical conversion relay amplification system capable of a relay with the economical constitution in which the beat noise is avoided in uplink line of the optical transmission line of multibranching and multinode multiplexing type.

The present invention is an optical conversion relay amplification system, wherein said optical conversion relay amplification system has a fixed central station for transmission and receiving of a radio signal from a base station and a plurality of fixed relay stations located in intermediate position in the downlink optical fiber line from said fixed central station and an uplink optical fiber line to said fixed central station, said fixed central station is a fixed central station converting a radio signal arrived from said base station to an optical signal to output to said downlink optical fiber line, and also converting the optical signal inputted from said uplink optical fiber line to a high frequency electric signal to send to said base station, and said fixed relay station is a fixed relay station dividing the downlink optical signal from said downlink optical fiber line to multiplex with said uplink optical fiber line, converting the multiplexed optical signal to an electric signal, transmitting the downlink electric signal included in said converted electric signal to portable phone by wireless system, and also receiving the radio signal arrived from the said portable phone to multiplex with an uplink electric signal included in said converted electric signal and converting the multiplexed electric signal to an optical signal to output to said uplink optical fiber line.

Thus, the beat noise in the uplink line can be avoided and the communication of a portable phone located in a dead spot with a base station can be relayed in an economic constitution.

Further, the present invention has a fixed central station working for transmission/receiving of a signal to/from public networks, and a plurality of fixed relay station located in intermediate position of a downlink optical fiber line from said fixed central station and an uplink optical fiber line toward said fixed central station, in an optical conversion relay amplification system, wherein said fixed central station is a fixed central station modulating a signal received from said public network to make a high frequency signal to convert to an optical signal for output to said downlink optical fiber line, and also converting the optical signal inputted from said uplink optical fiber line to a high frequency electric signal, demodulate to transmit to said public network, and said fixed relay station is a fixed relay station branching the downlink optical signal from said downlink optical fiber line to multiplex with said downlink optical fiber line, converting the multiplexed optical signal to an electric signal, transmitting downlink electric signal contained in the converted electric signals to a portable phone by radio, and also receiving an electric signals from said portable phone to multiplex with uplink electric signals contained in said converted electric signals, and converting the multiplexed electric signals to optical signals to output to said uplink optical fiber line.

Thus, communications between a portable phone located in a dead spot and a public network can be relayed with the economical constitution in which the beat noise is avoided in uplink line.

Furthermore, the present invention has a fixed central station to receive a radio signal arrived from a base station and a plurality of fixed relay stations located in an intermediate position in downlink optical fiber line from said fixed central station and an uplink optical fiber line to said fixed central station in an optical conversion relay amplification system, wherein said fixed central station is a fixed central station, wherein a radio signal received from said base station is converted to an optical signal to output to said downlink optical fiber line, and also an optical signal inputted from said uplink optical fiber line is converted to an electric signal to receive a surveillance signal of a surveillance result in said fixed relay station, and said fixed relay station is a fixed relay station, wherein a downlink optical signal branches from said downlink optical fiber line to multiplex with said uplink optical fiber line, the multiplexed optical signal is converted to an electric signal, a downlink electric signal contained in the converted electric signals is transmitted to a radio paging receiver by wireless system, an uplink electric signal contained in said converted electric signals is multiplexed with the surveillance signal, and the multiplexed electric signals are converted to optical signals to output to said uplink optical fiber line.

Thus, paging from a base station to a paging receiver located in a dead spot can be relayed with the economical constitution in which the beat noise is avoided in the uplink line, and also a surveillance signal in a fixed relay station can be transmitted to the fixed central station by relaying.

Further, the present invention has a fixed central station to receive a signal from a public network and a plurality of fixed relay station located in intermediate position of a downlink optical fiber line from said fixed central station and an uplink optical fiber line to said fixed central station in an optical conversion relay amplification system, said fixed central station is a fixed central station, wherein a signal received from said public network is modulated to a high frequency signal, converted to an optical signal to output to said downlink optical fiber line, and also the optical signal inputted from said uplink optical fiber line is converted to an electric signal to receive a surveillance signal of a surveillance result in said fixed relay station, said fixed relay station is a fixed relay station, wherein a downlink optical signal branches from said downlink optical fiber line to multiplex with said uplink optical fiber line, the multiplexed optical signal is converted to an electric signal, a downlink electric signal contained in the converted electric signals is transmitted to a paging receiver by wireless system, an uplink electric signal contained in said converted electric signals is multiplexed with the surveillance signal, the multiplexed electric signals are converted to optical signals to output to said uplink optical fiber line.

Thus, paging from a public network to a paging receiver located in a dead spot can be relayed with the economical constitution in which the beat noise is avoided in uplink line, and also a surveillance signal in a fixed relay station can be transmitted to the fixed central station by relaying.

Furthermore, the present invention has a fixed central station to transmit/receive a radio signal to/from a base station and a plurality of fixed relay station located in intermediate position of respective downlink optical fiber line from said fixed central station and uplink optical fiber line to said fixed central station in an optical conversion relay amplification system, said fixed central station is a fixed central station, wherein a surveillance controlling signal controlling surveillance in said fixed relay station is multiplexed with a radio signal received from said base station, said multiplexed electric signal is converted to an optical signal to output to said downlink optical fiber line, and also an optical signal inputted from said uplink optical fiber line is converted to an electric signal, and said electric signal is separated into a signal to said base station and a surveillance signal of a surveillance result in said fixed relay station to transmit said signal for said base station to said base station, and also said surveillance signal is received, and said fixed relay station is a fixed relay station, wherein a downlink optical signal branches from said downlink optical fiber line to multiplex with said uplink optical fiber line, the multiplexed optical signal is converted to an electric signal, a downlink electric signal contained in the converted electric signals is separated into a signal for a portable phone and a surveillance controlling signal, the separated signal for a portable phone is transmitted to a portable phone by wireless system, and also surveillance is carried out on the basis of said separated surveillance controlling signal, the surveillance signal yielded by said surveillance, the radio signal received from said portable phone, and an uplink electric signal contained in said converted electric signals is multiplexed, and the multiplexed electric signals are converted to optical signals to output to said uplink optical fiber line.

Thus, communications between a portable phone and a base station located in a dead spot can be relayed with the economical constitution in which the beat noise is avoided in uplink line, and also communications of a surveillance controlling signal and a surveillance signal between a fixed central station and a fixed relay station can be relayed.

Also furthermore, the present invention has a fixed central station to transmit/receive a signal to/from a public network and a plurality of fixed relay station located in intermediate position of respective downlink optical fiber line from said fixed central station and uplink optical fiber line to said fixed central station in an optical conversion relay amplification system, said fixed central station is a fixed central station, wherein a surveillance controlling signal controlling surveillance in said fixed relay station is multiplexed with a high frequency signal generated by modulating a signal received from said public network, said multiplexed electric signal is modulated and converted to an optical signal to output to said downlink optical fiber line, and also an optical signal inputted from said uplink optical fiber line is converted to an electric signal, and said electric signal is separated into a signal for said public network and a surveillance signal of a surveillance result in said fixed relay station to transmit a signal for said public network to said public network after demodulation, and also said surveillance signal is received, and said fixed relay station is a fixed relay station, wherein a downlink optical signal branches from said downlink optical fiber line to multiplex with said uplink optical fiber line, the multiplexed optical signal is converted to an electric signal, a downlink electric signal contained in the converted electric signals is separated into a signal for a portable phone and a surveillance controlling signal, the separated signal for a portable phone is transmitted to a portable phone by wireless system, and also surveillance is carried out on the basis of said separated surveillance controlling signal, the surveillance signal yielded by said surveillance, the radio signal received from said portable phone, a surveillance signal outputted from said surveillance controlling signal unit, and an uplink electric signal contained in said converted electric signals are multiplexed, and the multiplexed electric signals are converted to optical signals to output to said uplink optical fiber line.

Thus, communications between a portable phone and a public network located in a dead spot can be relayed with the economical constitution in which the beat noise is avoided in uplink line, and also communications of a surveillance controlling signal and a surveillance signal between a fixed central station and a fixed relay station can be relayed.

Finally, in an optical conversion relay amplification system of the present invention, the antenna of the relay station is a leaky coaxial cable and with the economical constitution in which the beat noise is avoided in uplink line, and also communications of a portable phone or a paging receiver with a base station of mobile communications or a higher rank network can be relayed for linearly extending dead spots as service areas.

BRIEF DESCRIPTION OF THE DRAWINGS

FIG. 8 is a block diagram of a conventional optical conversion relay amplification system and an optical network employing the conventional system.

DESCRIPTION OF REFERENCE NUMERALS

Figure 1:
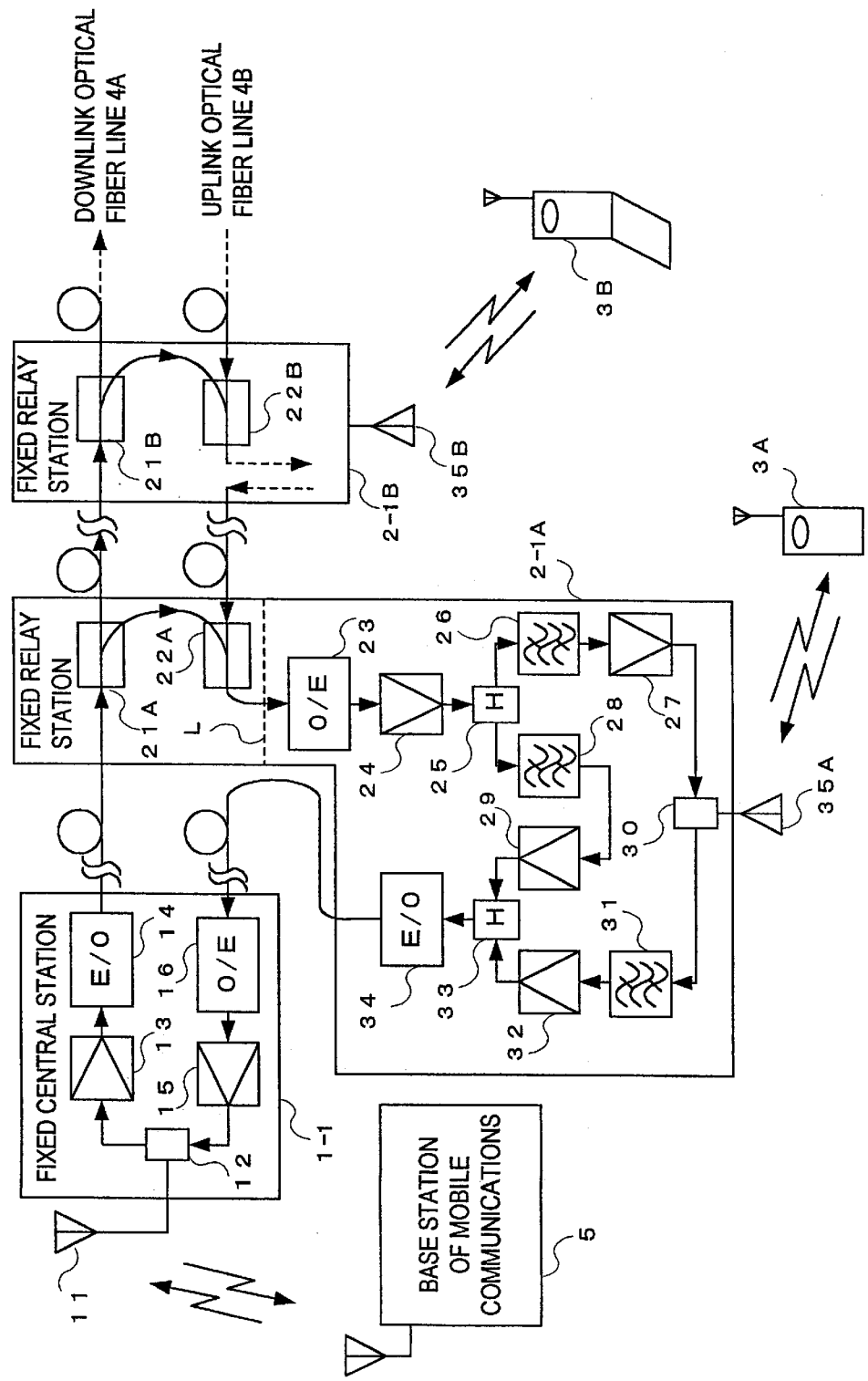
FIG. 1 is a block diagram showing an exemplary constitution of the 1st optical conversion relay amplification system of the present invention.

1—1, 1-2, 1-3, 1-4, 1-5, 1-6: fixed central station; 2-1A, 2-1B, 2-2A, 2-2B, 2-3A, 2-39, 2-4A, and 2-4B: fixed relay station; 3A and 32: portable apparatus (portable phone), 4A: downlink optical fiber line; 4B: uplink optical fiber line; 5: base station of mobile communications; 6A and 6B: leaky coaxial cable; 7: higher rank network; 8A and 8B: radio paging receiver; 10: uplink band pass filter for transmission; 10': band pass filter for surveillance signal; 11, 11', 35A, 35B, 35'A, and 35'B: antenna; 12 and 30: antenna distributor; 13, 15, 24, 27, 29, 32 and 38: amplifier: 14 and 34; electric/optical converter; 16 and 23: optical/electric converter; 17: high frequency modulator; 17': modulator for surveillance controlling signal; 18: high frequency demodulator; 18': demodulator for surveillance signal; 19: surveillance processing unit; 19': surveillance controlling indication unit; 20: power distributor unit; 20': power multiplexer; 21A and 21B: optical branching device; 22A and 22B: optical multiplexer; 25 and 25': power distributor; 26: downlink band path filter; 28: uplink band pass filter for relaying; 31: uplink band pass filter for receiving 33 and 33': power multiplexer; 36: modulator for surveillance signal; 37 and 37': surveillance controlling unit; 39: band pass filter for surveillance controlling signal; 40: demodulator for surveillance controlling signal.

DETAILED DESCRIPTION OF THE PREFERRED EMBODIMENTS

Mode for carrying out the present invention is herewith described with reference to drawings.

First, the first mode for carrying out the present invention is herewith described with reference to drawings. An optical conversion relay amplification system of the first mode for carrying out the present invention relates to claim 1 and claim 7.

An optical conversion relay amplification system of the present invention makes communications between a portable phone located in a dead spot and a base station possible by achieving the economical constitution in which a beat noise in uplink signals caused by optical signal multiplex is avoided on the basis that a downlink radio signal received from the base station is converted to an optical signal in the fixed central station to transmit via a downlink optical fiber line and a downlink optical signal branches in the fixed relay station to subject to optical multiplexing with the uplink optical signal transmitted from a lower rank fixed relay station via uplink optical fiber line, the multiplexed optical signal is converted to an electric signal, a downlink signal component contained in the electric signal is transmitted from an antenna to a portable phone by wireless system, an uplink signal components contained in the electric signal is subjected to power multiplex with an uplink signal transmitted from the portable phone followed by conversion to an optical signal to transmit via the optical fiber line and again converted to an electric signal by the fixed central station to transmit to the base station as an uplink radio signal.

An exemplary constitution of the first optical conversion relay amplification system of the present invention is herewith described with reference to FIG. 1. The FIG. 1 is a block diagram showing an exemplary constitution of the first optical conversion relay amplication system of the present invention. The first mode for carrying out the present invention is for the application to the relay amplification system of a portable phone. In the FIG. 1, examples presented are respective two sets of a fixed relay station and a portable phone to simplify the explanation.

The first optical conversion relay amplication system (the first system) of the present invention has an outlined constitution composed of a base station of mobile communications 5, a fixed central station 1—1, a downlink optical fiber line 4A and an uplink optical fiber line 4B, one or more fixed relay stations 2-1A and 2-1B having a cascade connection in intermediate position of these lines 4A and 4B, and portable apparatus 3A and 3B.

The base station 5 of mobile communications corresponds to the base station of claims and the portable apparatus 3A and 3B correspond to portable phones of claims.

Respective units of the first system of the present invention are explained below.

The base station 5 of mobile communications—an ordinary base station—is connected to a higher rank network than a public network, etc. by wired system to service a link of portable phone system.

The fixed central station 1—1 presents in the service area of the base station 5 of mobile communications and is located in a site showing qualified conditions of electric waves to transmit/receive radio waves to/from the base station 5 of mobile communications, and also mutually converts between the radio signal and optical signal for optical signal transmission and receiving. The internal details of the fixed central station 1—1 presents are stated later.

The fixed relay stations 2-1A and 2-1B are located in a dead spot such as a tunnel and an underground shopping center, etc. where a radio wave difficultly reaches, transmit/receive an optical signal to/from the fixed central station 1—1, and also mutually converts between optical signal and the radio signal for radio signal transmission and receiving. By this process, radio communications between portable apparatus presenting in dead spots and other area make possible. The internal details of the fixed relay stations 2-1A and 2-1B are stated later.

The portable apparatus 3A and 3B (mobile phone. etc.) present in the range reachable of radio waves from the fixed relay stations 2-1A and 2-1B and transmit/receive radio waves to/from the fixed relay stations 2-1A and 2-1B.

The downlink optical fiber line 4A is the optical fiber line to transmit an optical signal sent from the fixed central station 1—1 to the fixed relay stations 2-1A and 2-1B and an uplink optical fiber line 4B is the optical fiber line to transmit an optical signal sent from the fixed relay stations 2-1A and 2-1B to the fixed central station 1—1.

Next, the internal structure of the fixed central station 1—1 is described.

The fixed central station 1—1 has been constituted by an antenna 11 to transmit/receive a radio signal to/from the base station 5 of mobile communications, an antenna distributor 12 to use the antenna 11 for transmission and receiving, an amplifier 13 to amplify received radio signal, an electric/optical converter 14 (E/O in the FIG. 1) to convert the amplified radio signal (an electric signal) to an optical signal to send to the downlink optical fiber line 4A, an optical/electric converter 16 (O/E in the FIG. 1) to convert the optical signal received from the uplink optical fiber line 4B to an electric signal, and an amplifier 15 to amplify the converted electric signal.

Here, the electric/optical converter 14 corresponds to the first electric/optical converter of claims and the optical/electric converter 16 corresponds to the first optical/electric converter of claims.

The electric/optical converter 14 is, for example as stated later, subcarrier multiplexing analog optical modulator and the optical/electric converter 16 is a subcarrier multiplexing analog optical demodulator.

Subsequently, the followings are the explanation of the internal structure of the fixed relay stations 2-1A and 2-1B. The fixed relay stations 2-1A and 2-1B have same components and are explained herewith presenting the details of the internal structure of only the fixed relay stations 2-1A in the FIG. 1.

The fixed relay stations 2-1A is composed of an optical branching device 21A, optical multiplexer 22A, an optical/electric converter 23 (O/E in the FIG. 1), an amplifier 24, a power distributor 25, a downlink band pass filter 26, an amplifier 27, a relaying uplink band pass filter 28, an amplifier 29, an antenna distributor 30, an antenna 35A, a receiving uplink band pass filter 31, an amplifier 32, a power multiplexer 33, and the electric/optical converter 34 (E/O in the FIG. 1.)

The optical/electric converter 23 corresponds to the second optical/electric converter of claims and the electric/optical converter 34 corresponds to the second electric/optical converter of claims, the power distributer 25 corresponds to the first power distributer of claims, and the power multiplexer 33 corresponds to the first power multiplexer of claims.

The optical branching device 21A divides an optical signal and has one input end and two output ends (branched output ends.) the upstream end of the downlink optical fiber line 4A is connected to the input end, one of the two output ends is connected to the downstream end of the downlink optical fiber line 4A, and another end is connected to the first input end of the optical multiplexer 22A.

The branching ratio in the optical branching device 21A is determined in consideration of the multiplex ratio of the optical multiplexer 22A to equalize inputted optical powers into the optical/electric converters 23A, 23B, . . . n of respective fixed relay stations 2-1A, 2-1B, . . . n with cascade connection, and generally a value other than 50:50 (as a power ratio.)

In addition, the setting method of optical branching ratio, etc. for the optical branching device 21A is exemplarily determined according to "Single Fiber Multi Terminal Optic Links for Mobile Radio Communications using Automatic Wavelength-Offset Control", by Tarusawa et al., The Institute of Electronics Information and Communication Engineers, Technical Report of IEICE RCS94-70 (1994-09) as the followings.

Concerning the branching ratio in the optical branching device 21A for the downlink line, it is economic that amplifier gains, etc. of respective fixed relay stations 2-1A, B, . . . n can be commonly designed by fixing the strength Pr of an optical signal inputted into the optical/electric converters 23 of respective fixed relay stations 2-1A, B, . . . n.

Thus, the branching ratio (connection coefficient) $K_i$ of the optical branching device 21A of i-th fixed relay station is determined by the following [Formula 1.]

$$K_i = \frac{K_L^{i-2}}{\sum_{i=1}^{N-2} K_L^i + 2}$$

Where, KL represents the loss of an optical fiber, i is 3 or more. The connection coefficient KN of the optical multiplexer 22A nearest the fixed central station 1—1 is presented in the following [Formula 2.]

$$K_N = \frac{K_L^{N-2}}{\sum_{i=1}^{N-2} K_L^i + 2}$$

Making the strength of an optical signal as Ps to be outputted by the electric/optical converter 14 of the fixed central station 1—1, the photo-detecting level Pr in respective fixed relay stations 2-1A, B, . . . n is as following [formula 3.]

$$P_r = \frac{K_L^{N-1}}{\sum_{i=1}^{N-2} K_L^i + 2} \cdot P_s$$

The connection coefficient of the optical multiplexer 22A of the uplink line can be also calculated as same as the downlink line.

The optical multiplexer 22A multiplexes an optical signal and has two input ends (multiplex input end) and one output end. The one of the two input ends is connected to the second output end of the optical branching device 21A and the other end is connected to the upstream end of the uplink optical fiber line 4B, and the output end is connected to the input end of the optical/electric converters 23.

The multiplex ratio in the optical multiplexer 22A is as same as the branching ratio in the optical branching device 21A and is determined in consideration of the branching ratio of the optical branching device 21A to equalize inputted optical powers into the optical/electric converters 23A, 23B, . . . n of respective fixed relay stations 2-1A, 2-1B, . . . n.

The optical/electric converters 23 is, same as the optical/electric converter 16 of the fixed central station, a subcarrier multiplexing analog optical demodulator to convert an analog optical signal to an electric signal, and multiplexes a downlink optical signal from the fixed central station 1—1 with an uplink optical signal from the fixed relay station 2-1B in the optical multiplexer 22A to convert a multiplexed analog optical signal to an electric signal for outputting.

The amplifier 24, amplifier 27, amplifier 29, and amplifier 32 are ordinary amplifiers to amplify an electric signal to an appropriate level.

The power distributer 25 is ordinary distributor to output an inputted signal to two output ends, as it is.

The downlink band pass filter 26 is an ordinary band pass filter to pass frequency of the downlink signal only from the fixed central station 1—1.

The receiving uplink band pass filter 28 is an ordinary band path filter to pass a frequency band of only upstream electric signal from the fixed relay station (the fixed relay station 2-1B in the FIG. 1) located in upstream of the uplink line.

The antenna 35A is an ordinary antenna to transmit and receive a radio wave.

The antenna distributor 30 is an ordinary antenna distributor to use the antenna 35A for both transmission and receiving.

The receiving uplink band pass filter 31 is an ordinary uplink band pass filter to pass a frequency band of only upstream signal from a mobile apparatus 3A.

The power multiplexer 33 is an ordinary power multiplexer to subject to simple power multiplex of two electric signals.

The electric/optical converter 34 is, as same as the electric/optical convertor 14 of the fixed central station, the subcarrier multiplexing analog optical modulator modulates the multiplexed electric signal to an analog optical signal to output.

Next, the action of the first system of the present invention is explained with reference to the FIG. 1.

In the first system of the present invention, a downstream radio wave transmitted from the base station 5 of mobile communications is received by the antenna 11 of the fixed central station 1—1, amplified by the amplifier 13 to an appropriate level via the antenna distributer 12 followed by analog optical modulation by the electric/optical converter 14 to generate an optical signal, and sent to the downlink optical fiber line 4A.

Subsequently, this optical signal is divided by the optical branching device 21A of the first fixed relay stations 2-1A, and inputted to the one of the optical multiplexer 22A, and uplink optical signal from the second fixed relay station 2-1B is inputted to the other of the optical multiplexer 22A, multiplexed in the optical multiplexer 22A to yield a multiplexed analog signal.

The multiplexed analog signal is converted to an electric signal by the optical/electric converter 23 and amplified by the amplifier 24 if necessary, and divided into two signals by the power distributer 25.

A frequency of the downlink signal is extracted from the one of the divided two signals by the downlink band path filter 26 to become the downlink high frequency band signal, amplified by the amplifier 27 if necessary, and radiated as a radio wave from the antenna 35A of the first fixed relay stations 2-1A via the antenna distributor 30 to keep radio communications in the downlink direction toward a portable apparatus 3A.

On the other hand, only the uplink electric signal frequency is extracted from the other signal—divided by the power distributer 25—by the relaying uplink band path filter 28 to become an uplink high frequency band signal, amplified by the amplifier 29 if necessary, and inputted to one of the power multiplexer 33.

Concerning the uplink line from portable apparatus 3A to the base station 5 of mobile communications, the uplink radio signal transmitted from the portable apparatus 3A is received by the antenna 35A of the fixed relay stations 2-1A, limited its band by the receiving uplink band pass filter 31, amplified to an appropriate level by the amplifier 32 if necessary, and inputted to another power multiplexer 33.

The power multiplexer 33 multiplexes the power of uplink signal—outputted from the amplifier 29—from the second fixed relay station 2-1B with that of the uplink signal in the fixed relay stations 2-1A and the multiplexed output is modulated to an analog signal by the electric/optical converter 34 to send to the uplink optical fiber line 4B.

In the fixed central station 1—1, the uplink analog optical signal from the uplink optical fiber line 4B is demodulated to a high frequency signal by the optical/electric converter 16, amplified to an appropriate level by the amplifier 15 if necessary, and radiated from the antenna 11 to space via the antenna distributor 12 to send to the base station 5 of mobile communications.

For reference, in this mode for carrying out the present invention, the optical branching device 21A and the optical multiplexer 22A have been illustrated as located in a case of the fixed relay stations 2-1A. However, as shown with the dotted line L of the FIG. 1, the optical branching device 21A and the optical multiplexer 22A can be located in an optical fiber termination box for optical wiring to the fixed relay stations 2A.

According to the first system of the present invention, there is an effect to make possible radio communications between a portable apparatus 3 presenting in a dead spot and the base station 5 of mobile communications by locating the antenna 11 of the fixed central station 1—1 in a site giving an environment allowing high quality radio communications with the base station 5 of mobile communications and also locating a plurality of the fixed relay stations 2-1A, 2-1B, ... n—connected to the fixed central station 1—1 with an optical fiber—in a dead spot, such as a tunnel and an underground shopping center, where is difficult to receive a radio wave.

Besides, in the first system of the present invention, avoiding the occurrence of a beat noise in two optical waves is only required, because the fixed relay stations 2-1A receives a signal made by multiplex of two optical waves that are an optical signal of the downlink optical fiber line 4A and an optical signal from a lower rank fixed relay stations 2-1B linked by cascade connection. On principle, an optical generator exemplified by a semiconductor laser, etc. of two groups with previously selected wavelengths is only required.

This means that a complicated operation such as an automated frequency offset control is quite unnecessary concerning optical wavelengths from respective fixed relay stations 2-1A, 2-1B, . . . n. Therefore, an effect of constituting an economic system can be yielded in comparison with conventional systems.

In addition, in the first system of the present invention, an optical signal from the lower rank fixed relay stations 2-1B is once converted an electric signal to superimpose by power multiplex with a high frequency signal from the portable apparatus 3A existing in the area of the fixed relay stations 2-1A to convert to an optical signal again, in order to transmit an optical signal of the uplink line avoiding a beat noise.

Therefore, a factor limiting possible cascade connection numbers is accumulation of distortion and noise occurring in respective ranks.

Concerning this point, a result has been reported in the reference already introduced: the reference 6, Domon et al., "A proposal of an optical multiaccess using the subcarrier relay node multiplexing system", IECIE Tech. Rep., OCS93-99 (1994.)

According to this reference, an example has been calculated using a Fabry-Perot laser, that shows a 45 dBc tertiary intermodulation distortion in modulating with a double tones using two waves of a 135 dB/Hz relative noise intensity (RIN) and a 20% optical modulation, as a light source of a fixed relay station, and also using 10 $pA/(Hz)^{1/2}$ noise current density by input conversion and a 0.9 mA/mW optical conversion efficiency, as the characteristics of photodetector.

Thus, 20 cascade connections are possible in transmission of an FM signal with 27 MHz noise band width under the condition of a receiving CNR>17 dB.

According to the condition, 20 fixed relay stations in the cascade connection yields about 47 dB receiving CNR, when a radio signal for mobile communications of about 25 kHz noise band width is transmitted. The value can be improved by reducing the number of fixed relay stations in a whole system or by using a high performance laser such as DFB laser for light emission device.

In addition, in the first system of the present invention, at least one set of the optical/electric converter 23 is required in a fixed relay station to multiplex an optical signal of the downlink optical fiber line 4A with an optical signal of the uplink optical fiber line 4B by the optical multiplexer 22A followed by modulating it to an analog optical signal by the optical/electric converter 23. This processing means possible effect of a simple, economic constitution in comparison with conventional systems.

Next, the second mode for carrying out the present invention is herewith described with reference to drawings. The optical conversion relay amplification system related to the second mode for carrying out the present invention relates to claim 2 and claim 8.

The second optical conversion relay amplification system related to the second mode for carrying out the present invention is an applied example of the first system already described and has a structure of direct linking of the fixed central station with a higher rank network (a public network); in the fixed central station, a signal received the public network is modulated into a high frequency, converted to an optical signal, and outputted to the uplink optical fiber line, and an optical signal inputted from the uplink optical fiber line is converted to a high frequency electric signal, demodulated, and transmit to the public network. Communications by the system between portable phone in dead spots and the public network becomes possible by avoiding a beat noise caused by multiplex of an optical signal in the uplink signal and accomplishing an economic system constitution.

Figure 2:
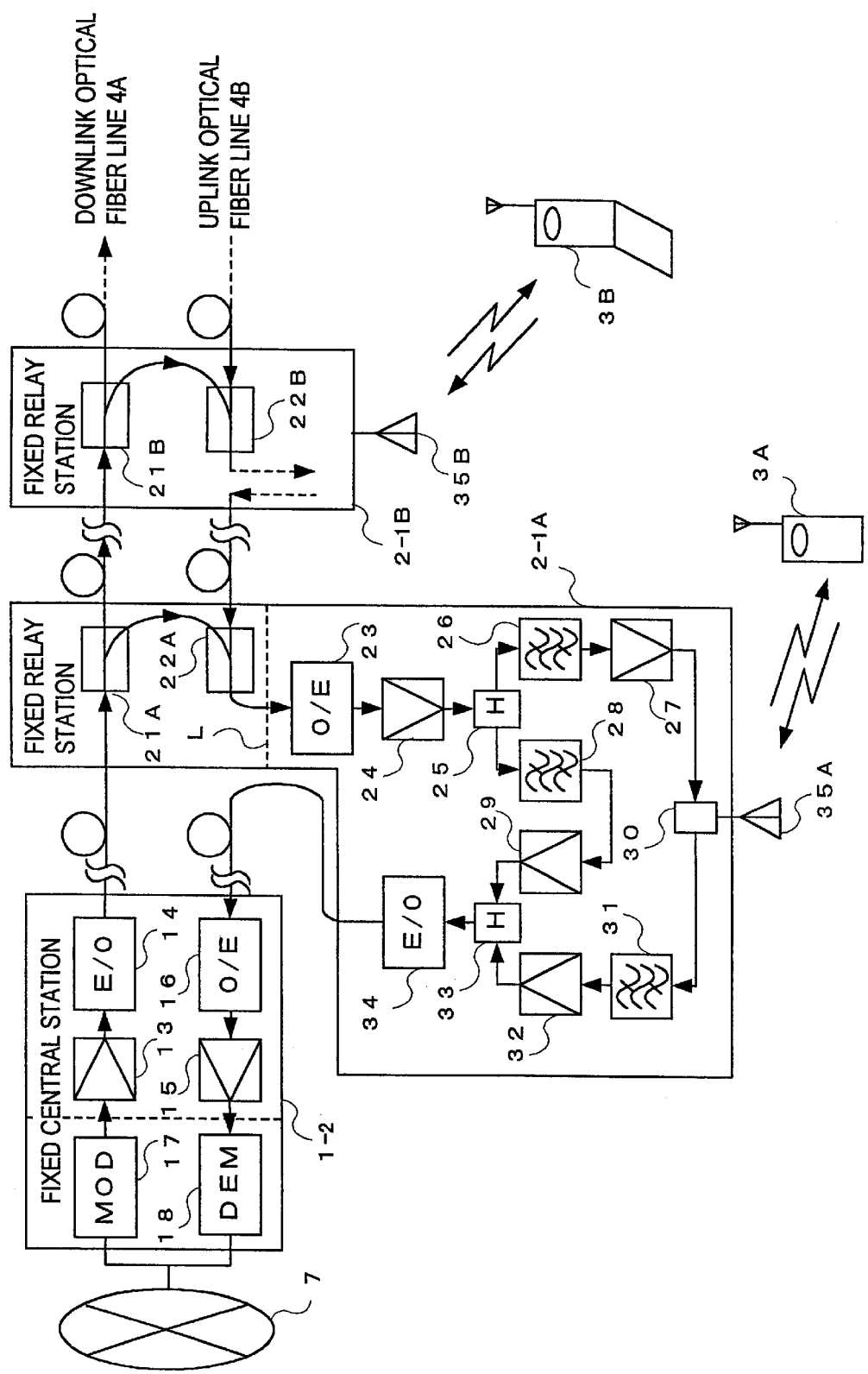
FIG. 2 is a block diagram showing an exemplary constitution of the 2nd optical conversion relay amplification system of the present invention.

First, as an example of constitution of the second optical conversion relay amplification system (the second system) related to the present invention, an applied example of constitution of the first system is herewith described with reference to FIG. 2. The FIG. 2 is a block diagram showing an example of constitution of the second optical conversion relay amplification system related to the present invention. Parts having same composition as those of the FIG. 1 are described with same symbols.

The second relay amplification system (the second system) by optical conversion related to the present invention is same as the first system, and the outlined structure is composed of a fixed central station 1-2 directly linked with a higher rank network 7, a downlink optical fiber line 4A and an uplink optical fiber line 4B, one or more fixed relay stations 2-1A and 2-1B linked by cascade connection in intermediate position of these lines 4A and 4B, and portable apparatus 3A and 3B (mobile phone. etc.)

In the second system, the downlink optical fiber line 4A and the uplink optical fiber line 4B, the fixed relay stations 2-1A and 2-1B, and the portable apparatus 3A and 3B are quite same as those of the first system, and the constitution of the fixed central station 1-2 somewhat differs from that of the first system.

The fixed central station 1-2 in the second system is, as same composition as that of the first system, composed of an amplifier 13 amplifying a downlink signal from a higher rank network 7, an electric/optical converter 14 (E/O in FIG. 2) converting the amplified electric signal to an optical signal, an optical/electric converter 16 (O/E in FIG. 2) converting the optical signal to an electric signal, and an amplifier 15 amplifying the electric signal to send, and the second system is characterized by a high frequency modulator 17 (MOD in FIG. 2) modulating the downlink signal from the higher rank network 7 to a high frequency signal, and a high frequency demodulator 18 (DEM in FIG. 2) demodulating an uplink high frequency signal to the higher rank network 7.

In the action of the second system of the present invention, the downlink signal from the higher rank network 7 is modulated to a high frequency signal by the high frequency modulator 17 of the fixed central station 1-2, amplified to an appropriate level by the amplifier 13, and subjected to the analog optical modulation by the electric/optical converter 14 to make an optical signal followed by sending the downlink optical fiber line 4A.

The subsequent actions in the fixed relay stations 2-1A and 2-1B are quite same as those of the first system.

On the other hand, in the uplink line from the portable apparatus 3A to the higher rank network 7, an uplink optical signal is sent to the uplink optical fiber line 4B, the optical signal is converted to a high frequency electric signal by the optical/electric converter 16 of the fixed central station 1-2, amplified to an appropriate level by an amplifier 15 if necessary, and demodulated by a high frequency demodulator 18 to output to the higher rank network 7; all these actions are quite same as those of the fixed relay stations 2-1A and 2-1B in the first system.

In the FIG. 2, only respective one figure has been presented for the high frequency modulator 17 and the high frequency demodulator 18 of the fixed central station 1-2 in order to simplify. However, in the downlink line, a plurality of the high frequency modulator 17 may be equipped for frequency multiplexing different frequency outputs from respective high frequency modulator 17 to subject to collectively the analog optical modulation by the electric/optical converter 14 followed by sending as a subcarrier multiplexing analog optical signal.

Further, the uplink line may have a constitution, in which a plurality of the high frequency demodulator 18 is equipped for simultaneous processing of multichannel signals.

There is almost no instance of a single wave in radio waves radiated by the base station of the portable phone system; a plurality of modulated waves of different frequencies is generated, multiplexed in frequencies, and radiated from another antenna.

In constitution of the apparatus of the present invention, it is preferable to adopt such subcarrier multiplexing system, because not only a single wave from a single high frequency modulator 17, but also a plurality of modulated waves from a plurality of the high frequency modulator 17 can be collectively transmitted.

According to the second system of the present invention, an effect can be accomplished for a simple, economic constitution of radio communications of the higher rank network 7 with the portable apparatus 3 existing in dead spots avoiding a beat noise, by making up the fixed central station 1-2 connecting directly with the higher rank network 7.

Next, the third mode for carrying out the present invention is herewith described with reference to drawings. The optical conversion relay amplification system related to the third mode for carrying out the present invention relates to claim 3 and claim 9.

The third optical conversion relay amplification system related to the third mode for carrying out the present invention is another applied example of said described first system; the radio paging system is replaced to the portable phone system and a surveillance signal in respective fixed relay stations transmitted to the fixed central station using the uplink line. This system has achieved an economic system constitution avoiding a beat noise caused by multiplexing of optical signals in uplink signals. By the system, radio paging communications from the base station of mobile communications to a radio paging receiver in a dead spot has become possible, and also the function of surveillance of fixed relay stations by the fixed central station can be simultaneously achieved.

Figure 3:
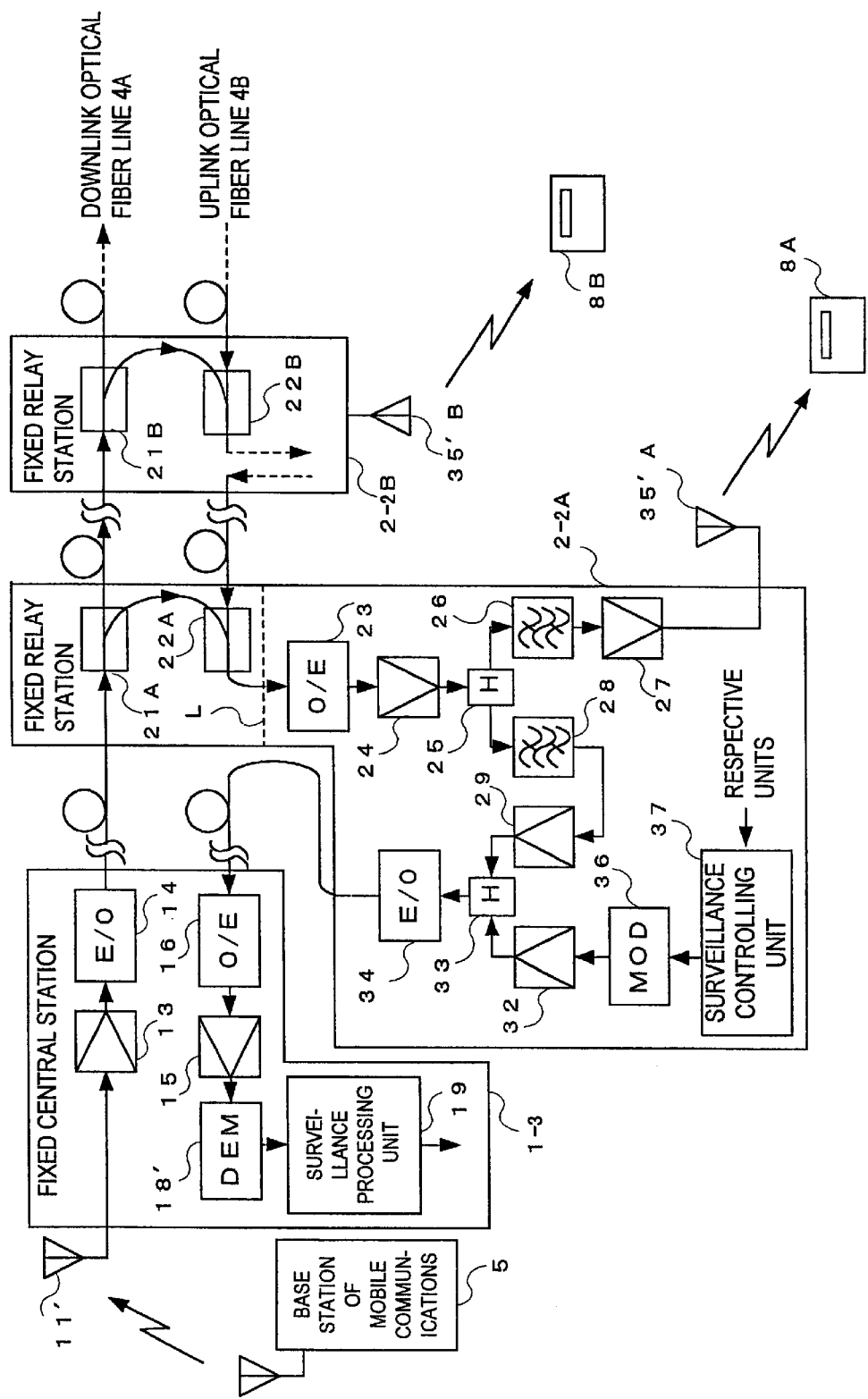
FIG. 3 is a block diagram showing an exemplary constitution of the 3rd optical conversion relay amplification system of the present invention.

First, as an exemplary constitution of the third optical conversion relay amplification system (the third system) of the present invention, an exemplary constitution by applying the first system is described with reference to FIG. 3. The FIG. 3 is a block diagram showing an example of constitution of the third optical conversion relay amplification system related to the present invention. Parts having same composition as those of the FIG. 1 are described with same symbols.

The radio paging (i. e., a pager or a pocket bell) system has paging function alone, and therefore, only a downlink signal exists as primary radio communications signal. However, the FIG. 3 is an example having a function of an uplink signal to send signals such as a system surveillance signal and emergency reporting signal, etc. from respective fixed relay stations 2—2 to higher rank systems (the fixed central station 1-3.)

The third optical conversion relay amplification system (the third system) related to the third mode for carrying out the present invention has an outlined constitution, same as that of the first system as shown in the FIG. 3, composed of the base station 5 of mobile communications, the fixed central station 1-3, the downlink optical fiber line 4A and the uplink optical fiber line 4B, one or more the fixed relay stations 2-1A and 2-1B linked by cascade connection in intermediate position of these lines 4A and 4B, and radio paging receivers 8A and 8B replaced to mobile phones as mobile apparatus.

However, the constitution of the fixed central station 1-3 and the fixed relay stations 2-2A and 2-2B of the third system somewhat differs from that of the first system.

The fixed central station 1-3 of the third system is composed of an antenna 11 to receive a radio signal, an amplifier 13 to amplify received radio signal, an electric/optical converter 14 (E/O in the FIG. 3) to convert amplified radio signal (an electric signal) to an optical signal to send to the downlink optical fiber line 4A, an optical/electric converter 16 (O/E in the FIG. 3) to convert the optical signal received from the uplink optical fiber line 4B to an electric signal, and an amplifier 15 to amplify the converted electric signal, as same components as those of the first system. In addition, the third system is characterized by equipping a demodulator for surveillance signal (DEM in FIG. 3) 18' demodulating an uplink high frequency electric signal to receive a surveillance signal and a surveillance signal processing unit 19 to process the surveillance signal demodulated.

The amplifier 13, the electric/optical converter 14, the optical/electric converter 16, and the amplified 15 in the fixed central station 1-3 of the third system are quite same as those of the first system and no description is given herewith.

The antenna 11' is an antenna for exclusive receiving use to receive a radio signal from the base station 5 of mobile communications.

The demodulator for surveillance signal 18' is a demodulator to demodulate a high frequency electric signal converted from an uplink optical signal, that is transmitted after conversion from a surveillance signal sent from the fixed relay stations 2-2A, B, . . . n., to extract finally the surveillance signal demodulated.

The surveillance signal processing unit 19 processes the demodulated signal as a surveillance signal; the specific processing entity of the surveillance signal processing unit 19 is not restricted in the present invention.

Next, the fixed relay stations 2—2 of the third system of the present invention is explained. Respective fixed relay stations 2-2A, B, . . . n have same components and FIG. 3 shows a detail of the internal structure of the fixed relay stations 2-2A only to explain herewith.

The fixed relay stations 2-2A of the third system is composed of an optical branching device 21A, an optical multiplexer 22A, an optical/electric converter 23 (O/E in the FIG. 3), an amplifier 24, a power distributer 25, a downlink band path filter 26, an amplifier 27, a relaying uplink band path filter 28, an amplifier 29, an antenna 35'A, an amplifier 32, a power multiplexer 33, and the electric/optical converter 34 (E/O in the FIG. 3;), as same constitution as that of the fixed relay station 2-1A of the first system; the third system is characterized by the modulator 36 (MOD in FIG. 3) for a surveillance signal and the surveillance controlling unit 37.

Where, the surveillance controlling unit 37 corresponds to the first surveillance controlling unit in claims.

The optical branching device 21A, the optical multiplexer 22A, the optical/electric converter 23, the amplifier 24, the power distributor 25, the downlink band pass filter 26, the amplifier 27, the relaying uplink band pass filter 28, the amplifier 29, the amplifier 32, the power multiplexer 33, and the electric/optical converter 34 in the fixed relay stations 2—2 of the third system are the same as those of the first system, and no description is given herewith.

The antenna 35' is an antenna for exclusive receiving use to receive a radio signal from the radio paging receiver 8A.

The surveillance controlling unit 37 monitors respective units inside the fixed relay station 2—2, receives a signal indicating the situation of respective units, prepares a surveillance signal to output; the specific prepared contents are not restricted in the present invention.

The modulator 36 for a surveillance signal is a modulator modulating the surveillance signal to a high frequency signal to transmit the surveillance signal as an uplink optical signal.

Next, the action of the third system of the present invention is described with reference to FIG. 3. However, the actions of the third system related to the downlink line from the base station 5 of mobile communications with radio paging receiver 8 are quite same as those of the first system, and no description is given herewith.

In the uplink line in the third system of the present invention, a surveillance signal is prepared by monitoring respective units of the fixed relay station 2-2A at the surveillance controlling unit 37, modulated to a high frequency signal by the modulator 36 for a surveillance signal, amplified to an appropriate level by an amplifier 32 if necessary, and subjected to power multiplex with a high frequency signal—outputted from the amplifier 29—of the surveillance signal from a lower rank fixed relay station 2-2B in the power multiplexer 33; the multiplexed output is modulated to an analog optical signal by the electric/optical converter 34 to send out to the uplink optical fiber line 4B.

In the fixed central station 1-3, an uplink analog optical signal from the uplink optical fiber line 4B is demodulated to a high frequency signal by the optical/electric converter 16 and amplified to an appropriate level by an amplifier 15 if necessary; the demodulator 18' for surveillance signal demodulate a surveillance signal and the surveillance signal processing unit 19 processes a necessary monitoring.

Changing a modulation frequency of the surveillance signal of respective fixed relay stations 2-2A, 2-2B, . . . n allows to know the situation of an optional fixed relay station by changing the tuned frequency of the demodulator 18' for surveillance signal of the fixed central station 1-3.

Changing a modulation frequency of the surveillance signal of respective fixed relay stations 2-2A, 2-2B, . . . n allows simultaneous monitoring the situation of all the fixed relay stations, if the fixed central station 1-3 has a plurality of the demodulator 18' for surveillance signal tuned to a modulated frequency of the surveillance signal of respective fixed relay stations.

Using the time division multiplexing system allows to monitor the situation of all the fixed relay stations, even if the modulated frequency of the surveillance signal of respective fixed relay stations are identical and the demodulator 18' for surveillance signal of the fixed central station 1-3 is only one set.

In this case, a direct transmission is also possible by using no modulator 36 for a surveillance signal of the fixed relay stations 2—2 to keep a base band.

Next, the fourth mode for carrying out the present invention is herewith described with reference to drawings. The optical conversion relay amplification system related to the fourth mode for carrying out the present invention relates to claim 4 and claim 10.

The fourth optical conversion relay amplification system related to the fourth mode for carrying out the present invention is another applied example by combination of the second system with the third system aforementioned, has a constitution with a direct link of the fixed central station to a higher rank network (public network), and outputs a signal received from the public network to the uplink optical fiber line by modulation and following conversion to an optical signal, in the fixed central station; this system has achieved an economic system constitution avoiding a beat noise caused by multiplexing of optical signals in uplink signals; by the system, radio paging communications from the higher rank network to a radio paging receiver in a dead spot has become possible, and also the function of surveillance of the fixed relay stations by the fixed central station can be simultaneously achieved.

Figure 4:
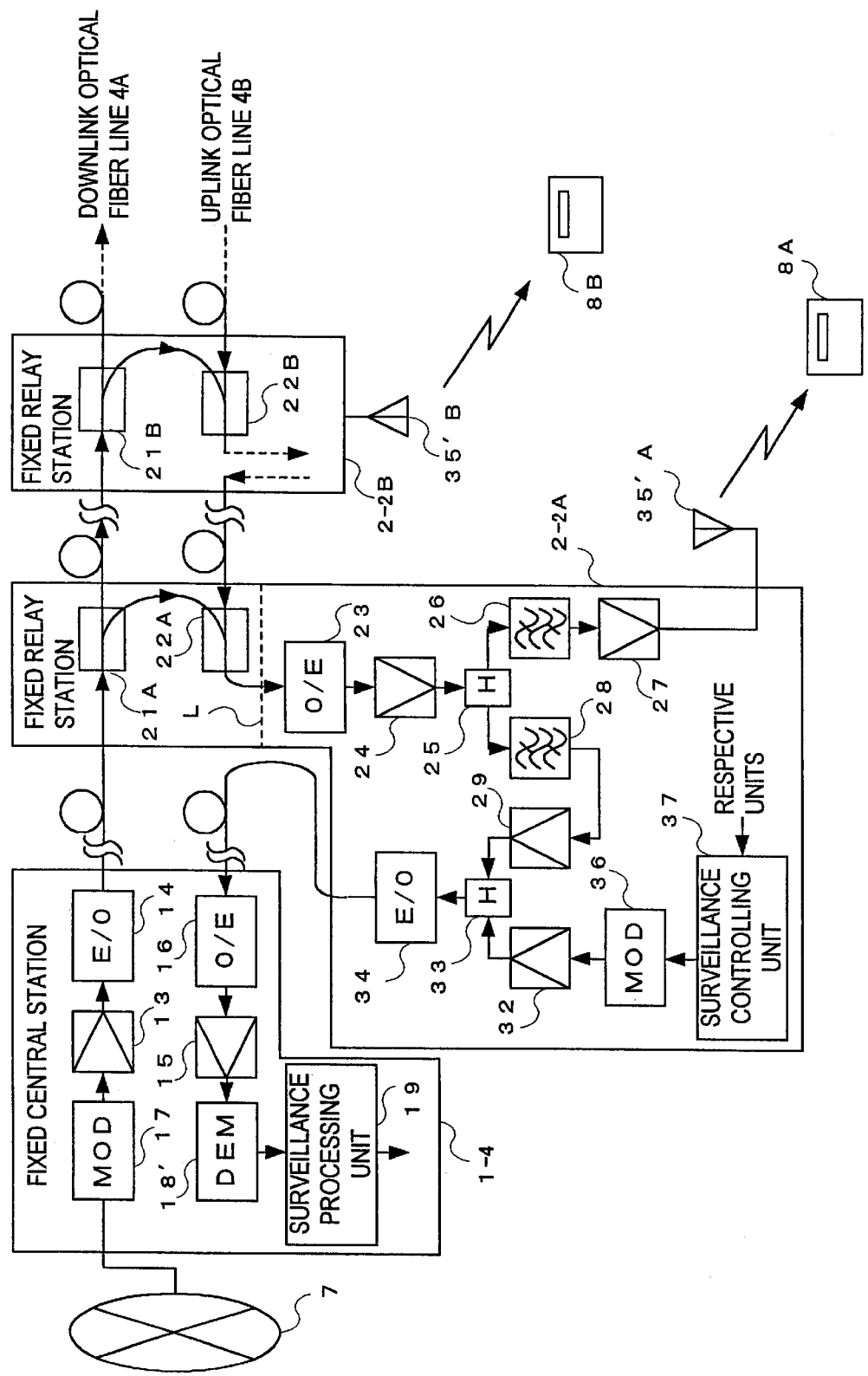
FIG. 4 is a block diagram showing an exemplary constitution of the 4th optical conversion relay amplification system of the present invention.

First, as an exemplary constitution of the fourth optical conversion relay amplification system (the fourth system) of the present invention, an exemplary constitution by applying the second and third systems is described with reference to FIG. 4. The FIG. 4 is a block diagram showing an example of constitution of the fourth optical conversion relay amplification system related to the present invention. Parts having same composition as those of the FIG. 2 and FIG. 3 are described with same symbols.

In the fourth optical conversion relay amplification system (the fourth system) of the present invention, the constitution and action of the fixed relay station 2—2 are quite same as those of said third system, and the constitution of the fixed central station 1-4 somewhat differs from that of the third system.

The fixed central station 1-4 of the fourth system is composed of an amplifier 13 amplifying a radio signal received, an electric/optical converter 14 (E/O in the FIG. 4) to convert an amplified radio signal (an electric signal) to an optical signal to send to the downlink optical fiber line 4A, an optical/electric converter 16 (O/E in the FIG. 4) to convert the optical signal received from the uplink optical fiber line 4B to an electric signal, an amplifier 15 to amplify the converted electric signal, a demodulator for surveillance signal (DEM in FIG. 4) 18' demodulating an uplink high frequency electric signal to receive a surveillance signal, and a surveillance signal processing unit 19 to process the demodulated signal as the surveillance signal, as the same parts as those of the third system; the fourth system is characterized by equipping a high frequency modulator (MOD in FIG. 4) 17 modulating the downlink signal from the higher rank network 7 to a high frequency signal.

The downlink line receives a signal from the higher rank network 7, modulates to a high frequency signal by the high frequency modulator 17 of the fixed central station 1-4, and finally works like the third system.

The actions of the uplink line are quite same as those of the third system.

As described in the third system, changing a modulation frequency of the surveillance signal of respective fixed relay stations allows to know the situation of an optional fixed relay station by changing the tuned frequency of the demodulator for surveillance signal 18' of the fixed central station 1-4, and simultaneous monitoring of the situation of all the fixed relay stations is possible by equipping a plurality of the demodulator 18' for surveillance signal tuned to a modulated frequency of the surveillance signal of respective fixed relay stations.

Besides, it is possible the surveillance signal of respective fixed relay stations is sent after modulating with the same modulation frequency by the time division multiplexing system and monitored by one set of the demodulator 18' for surveillance signal in the fixed central station 1-4. In this case, a direct transmission is also possible by using no modulator 36 for a surveillance signal of the fixed relay stations 2—2 to keep a base band.

The systems 3 and 4 of the present invention have achieved a simple, economic system constitution avoiding a beat noise and making radio communications with a radio paging receiver 8 existing in a dead spot possible; also the surveillance of respective fixed relay stations 2—2 can be simultaneously achieved by transmitting a surveillance signal of respective fixed relay stations 2—2 to the fixed central station 1-3 in the uplink line using the downlink line for the transmission of paging signal of the radio paging system.

Next, the fifth mode for carrying out the present invention is herewith described with reference to drawings. The optical conversion relay amplification system related to the fifth mode for carrying out the present invention relates to claim 5 and claim 11.

The fifth optical conversion relay amplification system related to the fifth mode for carrying out the present invention is an applied example by combination of the first system with the third system aforementioned and has an additional surveillance signal transmission system to the first system. In the fixed central station, a surveillance controlling signal for surveillance is multiplexed with downlink radio signal, converted to an optical signal for optical transmission, and also converted to an electric signal by the fixed relay station to extract the surveillance controlling signal, respective parts are monitored, the surveillance signal as a monitoring result is multiplexed with an uplink signal and converted to an optical signal for optical transmission; in the fixed central station, the surveillance signal is extracted from a signal converted to an electric signal to process for surveillance. Thus, this system has achieved an economic system constitution avoiding a beat noise caused by multiplexing of optical signals in uplink signals. By the system, communications of a portable apparatus in a dead spot have become possible, and also the function of surveillance of fixed relay stations by the fixed central station can be simultaneously achieved.

Figure 5:
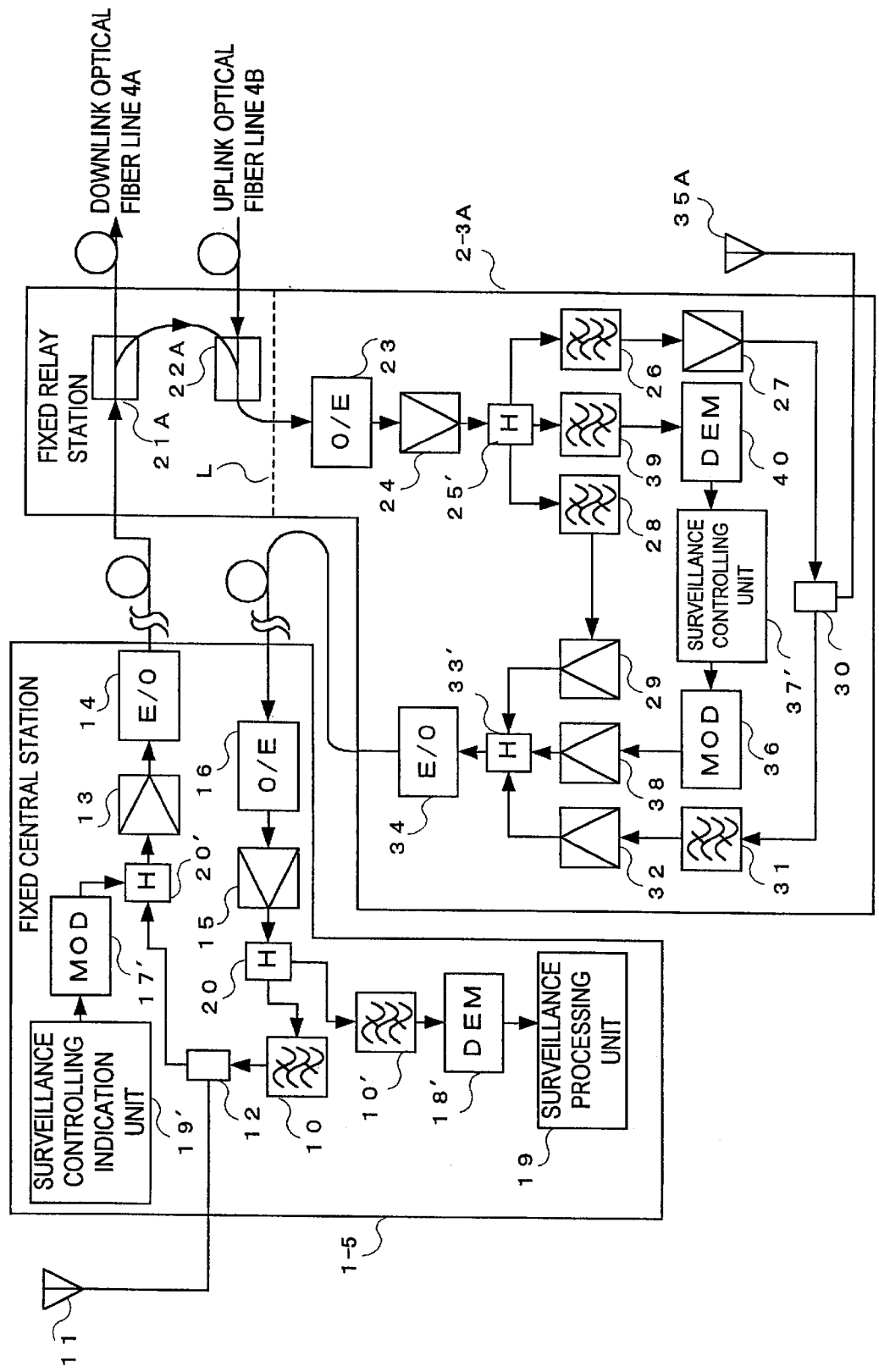
FIG. 5 is a block diagram showing an exemplary constitution of the 5th optical conversion relay amplification system of the present invention.

First, as an exemplary constitution of the fifth optical conversion relay amplification system (the fifth system) of the present invention, an exemplary constitution by applying to the first systems is described with reference to FIG. 5. The FIG. 5 is a block diagram showing an example of constitution of the fifth optical conversion relay amplification system related to the present invention. Parts having same composition as those of the FIG. 1 and FIG. 3 are described with same symbols.

The internal structure of the fixed central station 1 and the fixed relay station 2 of the fifth system of the present invention somewhat differs from that of the first system explained with reference to the FIG. 1.

The fixed central station 1-5 of the fifth system is composed of an antenna 11, an antenna distributor 12, an amplifier 13, an electric/optical converter 14, optical/electric converter 16, and an amplifier 15, as the same components as those of the fixed central station of the first system.

In addition to said constitution, the fifth system is characterized by equipping a surveillance control indication unit 19' to prepare a control signal (surveillance controlling signal) for monitoring the fixed relay station, a modulator (MOD in FIG. 5) 17' for modulating a surveillance control signal by high frequency modulation of the surveillance control signal, a power multiplexer 20' to multiplex the modulated surveillance control signal with a radio signal from the base station 5 for mobile terminals, a power distributor 20 to distribute a signal generated by conversion from an optical signal of the uplink line to an electrical signal to amplify, an uplink band pass filter 10 for transmission to extract an uplink signal—toward the base station for mobile terminals—from the distributed signal, a band pass filter 10' for a surveillance signal to extract the surveillance signal from the distributed signal, a demodulator 18' for surveillance signal (DEM in FIG. 5) demodulating a surveillance signal extracted, and a surveillance signal processing unit 19 to process the demodulated signal as a surveillance signal.

Where, the power multiplexer 20' as the characteristic part of the fifth system corresponds to the second power multiplexer of claims and the power distributor 20 corresponds to the second power distributor of claims.

Although the surveillance control indication unit 19' and the surveillance signal process unit 19 are described as separate components in the FIG. 5, the functions of the surveillance control indication unit 19' and the functions of the surveillance signal process unit 19 can be composed as a single circuit.

Next, the fixed relay station 2-3 in the fifth system has the following same components as those of the fixed relay stations 2-1 of the first system: an optical branching device 21A, an optical multiplexer 22A, an optical/electric converter 23, an amplifier 24, a power distributor 251, a downlink band pass filter 26, an amplifier 27, a relaying link band pass filter 28, an amplifier 29, an antenna distributor, 30, an antenna 35A, a receiving uplink band pass filter 31, an amplifier 32, a power multiplexer 33', and an electric/optical converter 34.

The fifth system differs from the first system in the point that the power distributer 25' has a single input and three outputs and that the power multiplexer 33' has three inputs and a single output.

In addition to the said constitution, the fifth system is characterized by a band pass filter 39 for a surveillance controlling signal to extract a surveillance controlling signal, a demodulator for surveillance controlling signal 40 (DEM 40 in the FIG. 5) to demodulate a surveillance controlling signal, a surveillance controlling unit 37' monitors and controls respective parts of the fixed relay station according to the surveillance controlling signal and preparing a surveillance signal from a signal indicating the situation of respective units, a modulator (MOD in FIG. 5) 36 for a surveillance signal modulating the surveillance signal to a high frequency signal, and an amplifier 38 amplifying a modulated surveillance signal to an appropriate level.

Where, The surveillance controlling unit 37' corresponds to the second surveillance controlling unit of claims.

Next, the action of the fifth system of the present invention is described with reference to FIG. 5.

In the fifth system of the present invention, the downlink signal sent from the base station of mobile communications (not shown) is received by an antenna 11 of the fixed central station 1-5, inputted to the one of the power multiplexer 20' via the antenna distributor; on the other hand, the surveillance controlling signal outputted from the surveillance control indication unit 19' is modulated by the modulator 17' for a surveillance control signal to input to the other of the power multiplexer 20'.

Subsequently, the received signal and the surveillance controlling signal are subjected to power multiplexing by the power multiplexer 20', amplified to an appropriate level by the amplifier 13, and subjected to the analog optical modulation by the electric/optical converter 14 to become an optical signal to be sent to the downlink optical fiber line 4A.

Next, the optical signal branches in the optical branching device 21A of the first fixed relay station 2-3A, said branched optical signal and an uplink optical signal from the second fixed relay station (not shown) are multiplexed by the optical multiplexer 22A, converted to an electric signal by the optical/electric converter 23, amplified by the amplifier 24 if necessary, and finally distributed in three signals by the power distributer 25.

Only the frequency of the surveillance controlling signal is extracted from the one of three distributed signals by the band pass filter 39 for a surveillance controlling signal, the surveillance controlling signal is demodulated in the demodulator 40 for a surveillance controlling signal, outputted to the surveillance controlling unit 37', and used for the surveillance control in the fixed relay station.

The downlink radio signal from the base station of wireless communications and uplink radio signal from the second fixed relay station—the remain of three divided signals by the power distributer 25—are processed like the first system.

The situation of respective parts in the fixed relay station 2-3 is monitored by the control of the surveillance controlling unit 37', the surveillance signal to send to the fixed central station 1-5 is prepared, the surveillance signal is modulated to a high frequency signal by the modulator 36 for a surveillance signal, and amplified by the amplifier 38 as one input to the power multiplexer 33'.

On the other hand, as the action as that if the first system, the uplink radio signal from a portable apparatus (not shown) and the uplink radio signal from the second fixed relay station become remained two signals of the power multiplexer 33' to subject the three signals to power multiplexing, the multiplexed output is modulated to an analog optical signal by the electric/optical converter 34 to send out to the uplink optical fiber line 4B.

In the fixed central station 1-5, the uplink analog optical signal from the uplink optical fiber line 4B is demodulated to a high frequency signal by the optical/electric converter 16, amplified to an appropriate level by the amplifier 15 if necessary followed by division into two signals by the power distributor 20, only uplink signal to the base station of mobile communications is extracted from the one by the uplink band pass filter 10 for transmission, and radiated from the antenna 11 to space via the antenna distributor 12 to transmit to the base station (not shown) of mobile communications.

Besides, only a surveillance signal is extracted from the other of divided two signals in the power distributor 20 by the band pass filter for surveillance signal 10', the surveillance signal is demodulated by the demodulator 18' for surveillance signal, the surveillance signal processing unit 19 processes a necessary surveillance.

Next, the sixth mode for carrying out the present invention is herewith described with reference to drawings. The optical conversion relay amplification system related to the sixth mode for carrying out the present invention relates to claim 6 and claim 12.

The sixth optical conversion relay amplification system related to the sixth mode for carrying out the present invention is an applied example by combination of the second system with the fifth system aforementioned; the fixed central station is directly linked with the higher rank network (the public network). A surveillance controlling signal is multiplexed with a high frequency signal generated by modulation of a signal received from the public network in the fixed central station to convert to an optical signal for outputting to the uplink optical fiber line. Thus, this system has achieved an economic system constitution avoiding a beat noise caused by multiplexing of optical signals in uplink signals. By the system, wireless communications of a portable phone in a dead spot with a higher rank network has become possible, and also the function of surveillance of fixed relay stations by the fixed central station can be simultaneously achieved.

Figure 6:
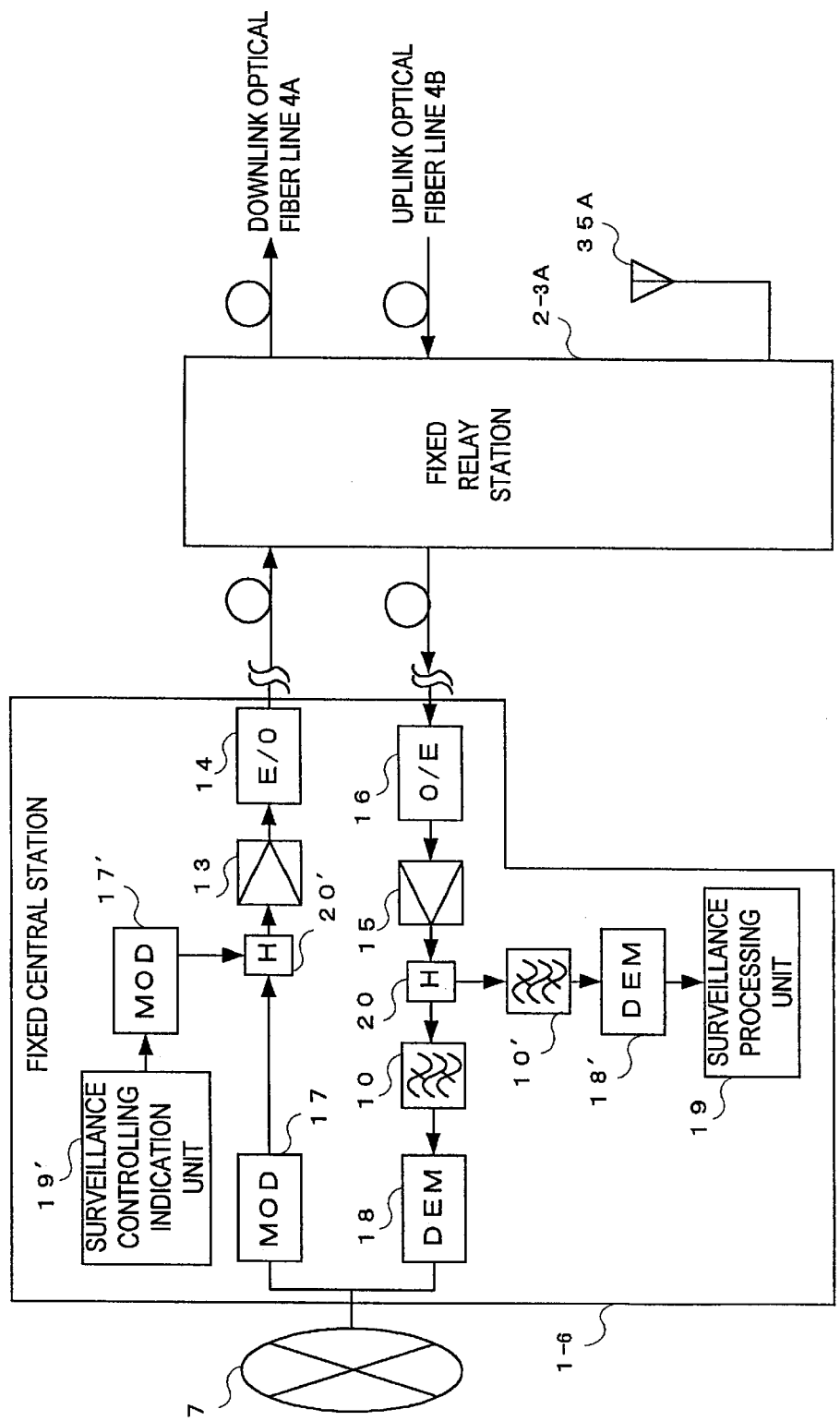
FIG. 6 is a block diagram showing an exemplary constitution of the 6th optical conversion relay amplification system of the present invention.

First, as an exemplary constitution of the sixth optical conversion relay amplification system (the sixth system) of the present invention, an exemplary constitution by applying the second and fifth systems is described with reference to FIG. 6. The FIG. 6 is a block diagram showing an example of constitution of the sixth optical conversion relay amplification system related to the present invention. Parts having same composition as those of the FIG. 2 and FIG. 5 are described with same symbols. The internal details of the fixed relay stations 2-3 are not given with any figure, because of quite same constitution thereof as that of said fifth system.

In the sixth optical conversion relay amplification system (the sixth system) of the present invention, the constitution and action of the fixed relay station 2-3 are quite same as those of said fifth system, and the constitution of the fixed central station 1-6 somewhat differs from that of the third system.

The fixed central station 1-6 of the sixth system is composed of an electric/optical converter 14, optical/electric converter 16, and an amplifier 15, as the same components as those of the fifth system.

The fixed central station of the sixth system is, as same components as that of the fifth system, composed of a surveillance control indication unit 19' to prepare a surveillance control signal, a modulator (MOD in FIG. 6) 17' for a surveillance controlling signal for high frequency modulation of the surveillance controlling signal, a power multiplexer 20' multiplexing the modulated surveillance control signal with a signal from the unlink network 7, an amplifier 13 amplifying a multiplexed signal, an electric/optical converter 14 converting the multiplexed signal to an optical signal, an optical/electric converter 16 converting the optical signal received from the uplink line to an electric signal, an amplifier 15 amplifying an electric signal, a power distributor 20 distributing an amplified signal, an uplink band pass filter 10 for transmission to extract an uplink signal from the distributed signal toward a higher rank network, a band pass filter 10' for a surveillance signal to extract the surveillance signal from the distributed signal, a demodulator 18' (DEM in FIG. 6) for surveillance signal demodulating a surveillance signal extracted, a surveillance signal processing unit 19 processing the demodulated signal as a surveillance signal.

In addition, the sixth system is characterized by equipping a high frequency modulator 17 (MOD in FIG. 6) modulating the downlink signal from the higher rank network 7 to a high frequency signal, and a high frequency demodulator 18 (DEM in FIG. 6) demodulating a high frequency electric signal of the uplink signal toward the higher rank network 7.

This means that the downlink line receives a signal from the higher rank network 7 and modulates to a high frequency signal by the high frequency modulator 17 of the fixed central station 1-6 to work as same as the fifth system.

On the other hand, in the work of the uplink line, a high frequency signal distributed by the power distributer 20 and restricted a band by the uplink band path filter 10 for transmission is demodulated by the high frequency demodulator 18 to send to the higher rank network 7, as same as the third system.

For reference, in said mode for carrying out the present invention for the fifth and sixth systems, it has been exemplified that a control signal for surveillance is superimposed to the downlink line and a surveillance signal is superimposed to the uplink line. However, the constitution only composed of the followings is possible: the controlled contents of surveillance are fixed and a surveillance signal is superimposed to the uplink line, as same as the third and fourth systems.

Besides, as described for the third and fourth systems, changing a modulation frequency of the surveillance signal of respective fixed relay stations allows to know the situation of an optional fixed relay station by changing both the passed frequency of the band pass filter 10' for a surveillance signal and the tuned frequency of the demodulator 18' for surveillance signal in the fixed central station 1-5 and 1-6, and simultaneous monitoring of the situation of all the fixed relay stations is possible by equipping a plurality of the band pass filter 10' for a surveillance signal tuned to a modulated frequency of the surveillance signal of respective fixed relay stations and the demodulator 18' for surveillance signal.

Besides, it is possible that the surveillance signal of respective fixed relay stations is sent after modulating with the same modulation frequency by the time division multiplexing system and monitored by one set of the demodulator 18' for surveillance signal in the fixed central station 1-5 and 1-6. In this case, a direct transmission is also possible by using no modulator 36 for a surveillance signal of the fixed relay stations 2-3 to keep a base band.

In the fifth and sixth systems of the present invention, the surveillance from the fixed central station 1-6 to the fixed relay station 2-3 is controlled by multiplexing the surveillance controlling signal with the downlink signal to transmit optically in the downlink line; a simple, economic system constitution is accomplished by avoiding a beat noise and making radio communications with a portable apparatus existing in a dead spot possible and the surveillance of respective fixed relay stations 2-3 can be simultaneously achieved by multiplexing the surveillance signal of respective fixed relay stations 2-3 with an uplink signal in the uplink line to transmit optically the surveillance signal to the fixed central station 1-6.

Next, the seventh mode for carrying out the present invention is herewith described with reference to drawings. The optical conversion relay amplification system related to the seventh mode for carrying out the present invention relates to claim 13.

The seventh optical conversion relay amplification system related to the seventh mode for carrying out the present invention is an applied example of the first to the sixth systems aforementioned, having a constitution using a leaky coaxial cable replaced to an antenna in respective fixed relay stations, and having possible communications of portable apparatus (a portable phone and a radio paging receiver) existing in a linearly extended dead spot with the base station of mobile communications and the public network, and also a possible economic system constitution avoiding a beat noise caused by multiplexing of optical signals in uplink signals.

Figure 7:
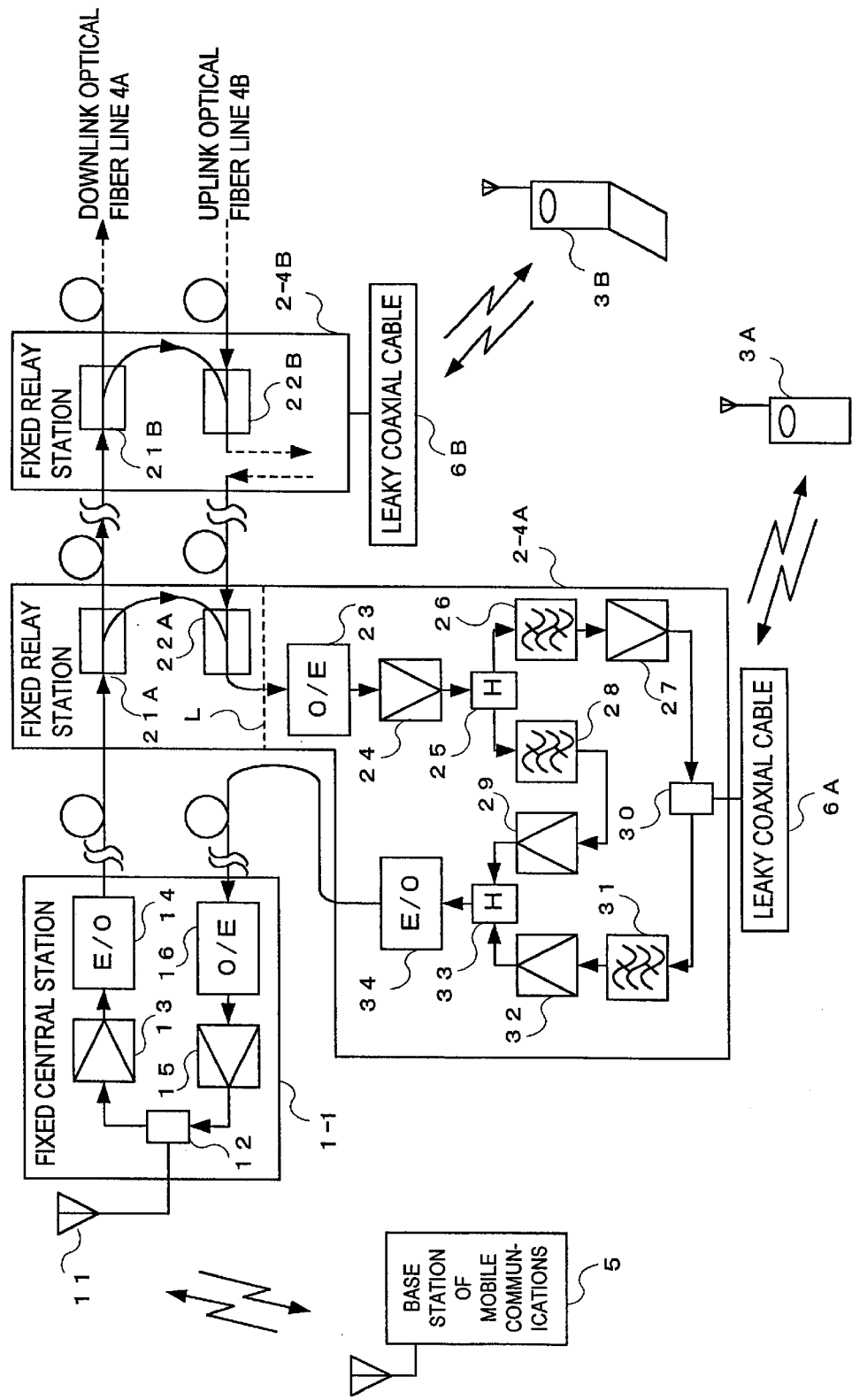
FIG. 7 is a block diagram showing an exemplary constitution of the 7th optical conversion relay amplification system of the present invention.

As an exemplary constitution of the seventh optical conversion relay amplification system (the seventh system) of the present invention, an exemplary embodiment by applying the first system is described with reference to FIG. 7. The FIG. 7 is a block diagram showing an example of constitution of the seventh optical conversion relay amplification system related to the present invention. Parts having same composition as those of the FIG. 1 are described with same symbols.

The outlined constitution of the seventh optical conversion relay amplification system (the seventh system) of the present invention and the internal details of the fixed central station 1—1 are quite same as those of the first system; however, somewhat differs from the first system in the internal constitution of the fixed relay stations 2-4A, 2-4B, . . . n.

Specifically, the seventh system of the present invention differs from the first system in equipping leaky coaxial cables 6A, 6B, . . . n replaced to the antenna 35 in the fixed relay stations 2-4A, 2-4B, . . . n; others are quite same.

Also for the second to the sixth systems, the seventh system can be made by equipping leaky coaxial cables 6A, 6B, . . . n replaced to the antenna 35 or antenna 35'.

The seventh system of the present invention, as same as the first to the sixth systems, has a possible economic system constitution avoiding a beat noise, particularly, a possible communication of a portable apparatus and a radio paging receiver existing in a service area of a linearly extended dead spot with the base station of mobile communications and the higher rank network.

Also in the mode for carrying out the present invention, the structure of optical transmission line of the downlink line has been explained with reference to the multibranching type to branch into 1:2 around the fixed relay station. The range to which the present invention is applied is not restricted to this type, but covers a star type transmission line or a combination of the star type with multibranching type, etc. in which the output of the electric/optical converter 6 of the fixed central station is distributed by a star coupler.

The optical conversion relay amplification system of the mode for carrying out the present invention makes communications between a portable phone, etc. located in a dead spot and the base station of mobile communications or the higher rank network possible by achieving the economical system constitution in which a beat noise caused by optical signal multiplex in uplink signals is avoided on the basis that a downlink optical signal is branched by the fixed relay station to subject to optical multiplexing with the uplink signal transmitted from a lower rank fixed relay station via uplink optical fiber line, the multiplexed optical signal is converted to an electric signal, a downlink signal component contained in said electric signal is transmitted from an antenna, etc. to a portable apparatus, etc., an uplink signal component contained in said electric signal is subjected to power multiplex with an uplink signal transmitted from the portable apparatus, etc. followed by conversion to an optical signal to transmit via the uplink optical fiber line, and an additional conversion to an electric signal to send as an uplink radio signal by the fixed central station.

The present invention is an optical conversion relay amplification system that makes possible the relay of communications between a portable phone located in a dead spot and a base station by achieving the economical constitution in which a beat noise in uplink signals is avoided on the basis that the fixed central station converts a radio signal received from the base station to an optical signal to output to the downlink optical fiber line and the fixed relay station processes branching of a downlink optical signal from the downlink optical fiber line to multiplex with the uplink optical fiber line, the multiplexed optical signal is converted to an electric signal, a downlink electric signal contained in the converted electric signal is transmitted to a portable phone by wireless system, and also an uplink electric signal contained in the converted electric signal is multiplexed with a radio signal received from the portable phone, the multiplexed electric signal is converted to an optical signal to output to the uplink optical fiber line, and the fixed central station converts the optical signal inputted from the uplink optical fiber line to a high frequency electric signal to send to the base station.

According to the optical conversion relay amplification system of the present invention, a signal received from the public network is modulated to a high frequency, converted to an optical signal, and outputted to the downlink optical fiber line in the fixed central station, and the downlink signal in branches from the downlink optical fiber line to multiplex with the uplink optical fiber line, the multiplexed optical signal is converted to an electric signal, and a downlink electric signal contained in the converted electric signal is transmitted to a portable phone by wireless system, and also an uplink electric signal contained in the converted electric signal is multiplexed with a radio signal received from the portable phone, the multiplexed electric signal is converted to an optical signal to output to the uplink optical fiber line in the fixed relay station, and the fixed central station converts the optical signal inputted from the uplink optical fiber line to a high frequency electric signal, demodulate, and send to the public network. The relay of communications through the system between portable phone in dead spots and the public network becomes possible by avoiding a beat noise in the uplink line and accomplishing an economic system constitution.

Also according to the optical conversion relay amplification system of the present invention, the fixed central station converts a radio signal received from the base station to an optical signal to output to the downlink optical fiber line and the fixed relay station divides a downlink optical signal from the downlink optical fiber line to multiplex with the uplink optical fiber line, converts the multiplexed optical signal to an electric signal, and transmits the downlink electric signal contained in the converted electric signals to a paging receiver by wireless system, and also multiplex the uplink electric signal contained in the converted electric signals with the surveillance signal, and converts the multiplexed electric signals to optical signals to output to the uplink optical fiber line, the fixed central station converts an optical signal inputted from the uplink optical fiber line to a high frequency electric signal to receive a surveillance signal. The system provides a possible economic system constitution avoiding a beat noise in the uplink line, a possible paging communication of the base station with a radio paging receiver existing a dead spot, and a possible transmission of a surveillance signal in the fixed relay station to the fixed central station by relaying.

Further according to the optical conversion relay amplification system of the present invention, a signal received from the public network is modulated to a high frequency, converted to an optical signal, and outputted to the downlink optical fiber line by the fixed central station, the downlink optical signal branches from the downlink optical fiber line to multiplex with the uplink optical fiber line, the multiplexed optical signal is converted to an electric signal, a downlink electric signal contained in the converted electric signal is transmitted to a radio paging receiver by wireless system, and also an uplink electric signal contained in the converted electric signal is multiplexed with a surveillance signal, the multiplexed electric signal is converted to an optical signal to output to the uplink optical fiber line in the fixed relay station, and the fixed central station converts the optical signal inputted from the uplink optical fiber line to a high frequency electric signal to receive the surveillance signal. By the system, the relay paging from the public network to a radio paging receiver in dead spots becomes possible and the relay transmission of surveillance signal in the fixed relay station to the fixed central station also becomes possible, avoiding a beat noise in the uplink line and accomplishing an economic system constitution.

Furthermore according to the optical conversion relay amplification system of the present invention, the fixed central station multiplexes a surveillance controlling signal with a radio signal received from the base station to generate an electric signal, converts the multiplexed electric signal to an optical signal to output to the downlink optical fiber line; in fixed relay station, the downlink optical signal from the downlink optical fiber line branches to be multiplied with the uplink optical fiber line, the multiplexed optical signal is converted to an electric signal, the downlink electric signal contained in the converted electric signal is separated in a signal for a portable phone and a signal for surveillance control, the separated signal for a portable phone is sent to a portable phone by wireless system, the separated surveillance control signal is outputted to the surveillance controlling unit, and also an uplink electric signal contained in the converted electric signal, a radio signal received from the portable phone, and a surveillance signal from the surveillance controlling unit are multiplexed, the multiplexed electric signal is converted to an optical signal to send to the uplink optical fiber line; in the fixed central station, the optical signal inputted from the uplink optical fiber line is converted to a high frequency electric signal to separate a signal for the base station and a surveillance signal, the signal for the base station is sent to the base station, and the surveillance signal is received; thus, this system has achieved an economic system constitution avoiding a beat noise in uplink signals, the relay of communications of the base station with a portable apparatus in a dead spot becomes possible, communications of the surveillance controlling signal and the surveillance signal between the fixed central station and the fixed relay stations become possible.

Also furthermore according to the optical conversion relay amplification system of the present invention, the fixed central station multiplexes a surveillance control signal with an electric signal generated by modulation of a signal received from the public network to a high frequency signal in order to convert to an optical signal to output toward the downlink optical fiber line, the fixed relay station divides a downlink optical signal from the downlink optical fiber line to multiplex with the uplink optical fiber line, converts the multiplexed optical signal to an electric signal, and separates the downlink electric signal contained in the converted electric signals in a signal for a portable phone and a surveillance control signal, the separated signal for a portable phone is sent to the portable phone by wireless system, the separated surveillance control signal is outputted to the surveillance controlling unit, and also an uplink electric signal contained in the converted electric signal, a radio signal received from the portable phone, and a surveillance signal from the surveillance controlling unit are multiplexed, the multiplexed electric signal is converted to an optical signal to send to the uplink optical fiber line; in the fixed central station, the optical signal inputted from the uplink optical fiber line is converted to a high frequency electric signal to separate a signal for the public network and a surveillance signal, the signal for the public network is demodulated to send to the public network, and the surveillance signal is received; thus, this system has achieved an economic system constitution avoiding a beat noise in uplink line, the relay of communications of a portable apparatus in a dead spot with the public network becomes possible, the relay communications of the surveillance controlling signal and the surveillance signal between the fixed central stations and the fixed relay station becomes possible.

The present invention is said optical conversion relay amplification system employing a leaky coaxial cable as an antenna for the fixed relay station, allowing an economic system constitution avoiding a beat noise in the uplink line, and also allowing a relay communication of a portable phone or a radio paging receiver existing in a service area of a linearly extended dead spot with the base station of mobile communications and/or the higher rank network.

What is claimed is:

1. An optical conversion relay amplification system having a fixed central station for transmission and receiving of a radio signal from a base station and a plurality of fixed relay stations located in intermediate position in an uplink optical fiber line to said fixed central station, wherein said fixed central station is a fixed central station converting a radio signal arrived from said base station to an optical signal to output to said downlink optical fiber line, and also converting the optical signal inputted from said uplink optical fiber line to a high frequency electric signal to send to said base station, and said fixed relay station is a fixed relay station dividing the downlink optical signal from said downlink optical fiber line, multiplexing with the divided downlink optical signal and an uplink optical signal from said uplink optical fiber line, converting the multiplexed optical signal to an electric signal, transmitting the downlink electric signal contained in said converted electric signal to portable phone by wireless system, and also receiving the radio signal from the said portable phone to multiplex with an uplink electric signal contained in said converted electric signal and converting the multiplexed electric signal to an optical signal to output to said uplink optical fiber line.

2. An optical conversion relay amplification system having a fixed central station working for transmission/receiving of a signal to/from public networks, respectively, and a plurality of fixed relay station located in intermediate position in downlink optical fiber line from said fixed central station and an uplink optical fiber line toward said fixed central station, wherein said fixed central station is a fixed central station modulating a signal received from said public network to make a high frequency signal to convert to an optical signal for output to said downlink optical fiber line, and also converting the optical signal inputted from said uplink optical fiber line to a high frequency electric signal, demodulate to transmit to said public network, and said fixed relay station is a fixed relay station dividing the downlink optical signal from said downlink optical fiber line, multiplexing with the divided downlink optical signal and an uplink optical signal from said uplink optical fiber line, converting the multiplexed optical signal to an electric signal, transmitting downlink electric signal contained in the converted electric signals to a portable phone by radio, and also receiving a radio signal from said portable phone to multiplex with uplink electric signals contained in said converted electric signals, and converting the multiplexed electric signals to optical signals to output to said uplink optical fiber line.

3. An optical conversion relay amplification system having a fixed central station to receive a radio signal arrived from a base station and a plurality of fixed relay stations located in an intermediate position in downlink optical fiber line from said fixed central station and an uplink optical fiber line to said fixed central station, wherein said fixed central station is a fixed central station, wherein a radio signal received from said base station is converted to an optical signal to output to said downlink optical fiber line, and also an optical signal inputted from said uplink optical fiber line is converted to an electric signal to receive a surveillance signal of a surveillance result in said fixed relay station, and said fixed relay station is a fixed relay station, wherein a downlink optical signal branches from said downlink optical fiber line, the branched downlink optical signal is multiplexed with an uplink optical signal from said uplink optical fiber line, the multiplexed optical signal is converted to an electric signal, a downlink electric signal contained in the converted electric signals is transmitted to a radio paging receiver by wireless system, an uplink electric signal contained in said converted electric signals is multiplexed with the surveillance signal, and the multiplexed electric signals are converted to optical signals with the surveillance signal, the multiplexed electric signals are converted to optical signals to output to said uplink optical fiber line to output to said uplink optical fiber line.

4. An optical conversion relay amplification system having a fixed central station to receive a signal from a public network and a plurality of fixed relay station located in intermediate position of a downlink optical fiber line from said fixed central station and an uplink optical fiber line to said fixed central station, wherein said fixed central station is a fixed central station, wherein a signal received from said public network is modulated to a high frequency signal, converted to an optical signal to output to said downlink optical fiber line, and also the optical signal inputted from said uplink optical fiber line is converted to an electric signal to receive a surveillance signal of a surveillance result in said fixed relay station, and said fixed relay station is a fixed relay station, wherein a downlink optical signal branches from said downlink optical fiber line, the branched downlink optical signal is multiplexed with an uplink optical signal from said uplink optical fiber line, the multiplexed optical signal is converted to an electric signal, a downlink electric signal contained in the converted electric signals is transmitted to a paging receiver by wireless system, an uplink electric signal contained in said converted to optical signals with the surveillance signal, the multiplexed electric signals are converted to optical signals to output to said uplink optical fiber line to output to said uplink optical fiber line.

5. An optical conversion relay amplification system having a fixed central station to transmit/receive a radio signal to/from a base station and a plurality of fixed relay station located in intermediate position of a downlink optical fiber line from said fixed central station and an uplink optical fiber line to said fixed central station, wherein said fixed central station is a fixed central station, wherein a surveillance controlling signal controlling surveillance in said fixed relay station is multiplexed with a radio signal received from said base station, said multiplexed electric signal is converted to an optical signal to output to said downlink optical fiber line, and also an optical signal inputted from said uplink optical fiber line is converted to an electric signal, and said electric signal is separated into a signal to said base station and a surveillance signal of a surveillance result in said fixed relay station to transmit said signal to said base station, and also said surveillance signal is received, and said fixed relay station is a fixed relay station, wherein a downlink optical signal branches from said downlink optical fiber line, the branched downlink optical signal is multiplexed with an uplink optical signal from said uplink optical fiber line, the multiplexed optical signal is converted to an electric signal, a downlink electric signal contained in the converted electric signals is separated into a signal for a portable phone and a surveillance controlling signal, the surveillance signal yielded by said surveillance, the radio signal received from said portable phone, and an uplink electric signal contained in said converted electric signal are multiplexed, and the multiplexed electric signals are converted to optical signals to output to said uplink optical fiber line.

6. An optical conversion relay amplification system having a fixed central station to transmit/receive a signal to/from a public network and a plurality of fixed relay station located in an intermediate position of respective downlink optical fiber line from said fixed central station and an uplink optical fiber line to said fixed central station, wherein said fixed central station is a fixed central station, wherein a surveillance controlling signal controlling surveillance in said fixed relay station is multiplexed with a high frequency signal generated by modulating a signal received from said public network, said multiplexed electric signal is modulated and converted to an optical signal to output to said downlink optical fiber line, and also an optical signal inputted from said uplink optical fiber line is converted to an electric signal, and said electric signal is separated into a signal for said public network and a surveillance signal of a surveillance result in said fixed relay station to transmit a signal for said public network to said public network after demodulation, and also said surveillance signal is received, and said fixed relay station is a fixed relay station, wherein a downlink optical signal branches from said downlink optical fiber line, the branched downlink optical signal is multiplexed with an uplink optical signal from said uplink optical fiber line, the multiplexed optical signal is converted to an electric signal, a downlink electric signal contained in the converted electric signals is separated into a signal for a portable phone and a surveillance controlling signal, the separated signal for a portable phone is transmitted to a portable phone by wireless system, and also surveillance is carried out on the basis of said separated surveillance controlling signal, the separated signal for a portable phone is transmitted to a portable phone by wireless system, and also surveillance is carried out on the basis of said separated surveillance controlling signal, the surveillance signal yielded by said surveillance, the radio signal received from said portable phone, a surveillance signal outputted from said surveillance controlling signal unit, and an uplink electric signal contained in said converted electric signals are multiplexed, and the multiplexed electric signals are converted to optical signals to output to said uplink optical fiber line.

7. An optical conversion relay amplification system having a fixed central station to transmit/receive a radio signal to/from a base station and a plurality of fixed relay stations located in an intermediate position in downlink optical fiber line from said fixed central station and an uplink optical fiber line to said fixed central station, wherein said fixed central station is a fixed central station having an antenna transmitting/receiving a radio signal to/from said base station, the first electric/optical converter converting a signal received with said antenna to an optical signal to output to said downlink optical fiber line, the first optical/electric converter converting an optical signal inputted from said uplink optical fiber line to an electric signal to output to said antenna, and said fixed relay station is a fixed relay station having an optical branching device in which an optical signal branches from said downlink optical fiber line, an optical multiplexer multiplexing an optical signal branched in said optical branching device with said uplink optical fiber line, the second optical/electric converter—located in the upstream of an uplink optical fiber line to which said optical multiplexer fitted—converting an optical signal to an electric signal, a first power distributor distributing said converted electric signal, an uplink band pass filter for relay to pass only an uplink electric signal contained in electric signals distributed by said first power distributor, a downlink band pass filter to pass only a downlink electric signal contained in electric signals distributed by said first power distributor, antenna sending a downlink electric signal passed through said downlink band pass filter to a portable phone by wireless system and receiving a radio signal from said portable phone, a receiving uplink band pass filter to pass only a radio signal—received by said antenna—from said portable phone, a first power multiplexer multiplexing an uplink electric signal passed through said relaying uplink band pass filter with a radio signal passed through said receiving uplink band pass filter, and a second electric/optical converter converting said multiplexed electric signal to an optical signal to output to said uplink optical fiber line.

8. An optical conversion relay amplification system according to claim 7, wherein a leaky coaxial cable is an antenna for the fixed relay station.

9. An optical conversion relay amplification system having a fixed central station to transmit/receive a signal to/from a public network and a plurality of fixed relay station located in an intermediate position of a downlink optical fiber line from said fixed central station and an uplink optical fiber line to said fixed central station, wherein said fixed central station is a fixed central station having a high frequency modulator modulating a signal received from said public network to yield a high frequency signal, a first electric/optical converter converting signal said modulated electric signal to an optical signal to output to said downlink optical fiber line, first optical/electric converter converting an optical signal inputted from said uplink optical fiber line to an electric signal, and a high frequency demodulator demodulating said converted high frequency electric signal to send to said public network, and said fixed relay station is a fixed relay station having an optical branching device in which an optical signal branches from said downlink optical fiber line, an optical multiplexer multiplexing an optical signal branched in said optical branching device with said uplink optical fiber line, a second optical/electric converter—located in upstream of an uplink optical fiber line to which said optical multiplexer fitted—converting an optical signal to an electric signal, a first power distributor distributing said converted electric signal, a relay uplink band pass filter to pass only an uplink electric signal contained in electric signals distributed by said first power distributor, a downlink band pass filter to pass only a downlink electric signal contained in electric signals distributed by said first power distributor, an antenna sending a downlink electric signal passed through said downlink band pass filter to a portable phone by wireless system and receiving a radio signal from said portable phone, a receiving uplink band pass filter to pass only radio signal—received with said antenna—from said portable phone, a first power multiplexer multiplexing an uplink electric signal passed through said relaying uplink band pass filter with a radio signal passed through said receiving uplink band pass filter, and a second electric/optical converter converting said multiplexed electric signal to an optical signal to output to said uplink optical fiber line.

10. An optical conversion relay amplification system having a fixed central station to transmit/receive a radio signal to/from a base station and a plurality of fixed relay stations located in an intermediate position in downlink optical fiber line from said fixed central station and an uplink optical fiber line to said fixed central station, wherein said fixed central station is a fixed central station having an antenna transmitting/receiving a radio signal to/from said base station, the first electric/optical converter converting a signal received with said antenna to an optical signal to output to said downlink optical fiber line, the first optical/electric converter converting an optical signal inputted from said uplink optical fiber line to an electric signal, a surveillance signal demodulator demodulating said converted electric signal to receive a surveillance signal as a result of surveillance in said fixed relay station, and said fixed relay station is a fixed relay station having an optical branching device in which an optical signal branches from said downlink optical fiber line, an optical multiplexer multiplexing an optical signal branched in said optical branching device with said uplink optical fiber line, the second optical/electric converter—located in the upstream of an uplink optical fiber line to which said optical multiplexer fitted—converting an optical signal to an electric signal, a first power distributor distributing said converted electric signal, a relaying uplink band pass filter to pass only an uplink electric signal contained in electric signals distributed by said first power distributor, a downlink band pass filter to pass only a downlink electric signal contained in electric signals distributed by said first power distributor, an antenna sending a downlink electric signal passed through said downlink band pass filter to a radio paging receiver by wireless system, a first surveillance control unit monitoring respective parts of said fixed relay station to output a surveillance signal, a modulator for a surveillance signal to modulate said surveillance signal, a first power multiplexer multiplexing an uplink electric signal passed through said relaying uplink band pass filter with an electric signal modulated by said modulator for a surveillance signal, and a second electric/optical converter converting said multiplexed electric signal to an optical signal to output to said uplink optical fiber line.

11. An optical conversion relay amplification system having a fixed central station to transmit/receive a signal to/from a public network and a plurality of fixed relay station located in an intermediate position of a downlink optical fiber line from said fixed central station and an uplink optical fiber line to said fixed central station, wherein said fixed central station is a fixed central station having a high frequency modulator modulating a signal received from said public network to yield a high frequency signal, a first electric/optical converter converting said modulated electric signal to an optical signal to output to said downlink optical fiber line, first optical/electric converter converting an optical signal inputted from said uplink optical fiber line to electric signal, and a demodulator for surveillance signal demodulating said converted electric signal to receive a surveillance signal as a result of surveillance in said fixed relay station, and said fixed relay station is a fixed relay station having an optical branching device in which an optical signal branches from said downlink optical fiber line, an optical multiplexer multiplexing an optical signal branched in said optical branching device with said uplink optical fiber line, a second optical/electric converter—located in upstream of an uplink optical fiber line to which said optical multiplexer fitted—converting an optical signal to an electric signal, a first power distributor distributing said converted electric signal, a relay uplink band pass filter to pass only an uplink electric signal contained in electric signals distributed by said first power distributor, a downlink band pass filter to pass only a downlink electric signal contained in electric signals distributed by said first power distributor, an antenna sending a downlink electric signal passed through said downlink band pass filter to a radio paging receiver by wireless system, a first surveillance control unit monitoring respective parts of said fixed relay station to output a surveillance signal, a modulator for a surveillance signal to modulate said surveillance signal, a first power multiplexer multiplexing an uplink electric signal passed through said relaying uplink band pass filter with an electric signal modulated by said modulator for surveillance signal, and a second electric/optical converter converting said multiplexed electric signal to an optical signal to output to said uplink optical fiber line.

12. An optical conversion relay amplification system having a fixed central station to transmit/receive a radio signal to/from a base station and a plurality of fixed relay stations located in an intermediate position in downlink optical fiber line from said fixed central station and an uplink optical fiber line to said fixed central station, wherein said fixed central station is a fixed central station having a modulator for surveillance control signal modulating a surveillance control signal to control surveillance in said fixed relay station, an antenna transmitting/receiving a radio signal to/from said base station, a second power multiplexer multiplexing a signal received with said antenna with said modulated surveillance control signal, a first electric/optical converter converting said multiplexed electric signal to an optical signal to output to said downlink optical fiber line, a first optical/electric converter converting an optical signal inputted from said uplink optical fiber line to an electric signal, a second power distributor distributing an electric signal converted by said first optical/electric converter, a transmitting uplink band pass filter to pass only a signal—contained in electric signals distributed by said second power distributor—for said base station to output to said antenna, a band pass filter for surveillance signal to pass only surveillance signal—contained in electric signals distributed by said second power distributor—as a result of surveillance in said fixed relay station, and a demodulator for surveillance signal demodulating a signal passed through said band pass filter for surveillance signal to receive a surveillance signal, and said fixed relay station is a fixed relay station having an optical branching device in which an optical signal branches from said downlink optical fiber line, an optical multiplexer multiplexing an optical signal branched in said optical branching device with said uplink optical fiber line, a second optical/electric converter—located in upstream of an uplink optical fiber line to which said optical multiplexer fitted—converting an optical signal to an electric signal, a first power distributor distributing said converted electric signal, a relay uplink band pass filter to pass only an uplink electric signal contained in electric signals distributed by said first power distributor, a downlink band pass filter to pass only a downlink electric signal contained in electric signals distributed by said first power distributor, a band pass filter for surveillance control signal to pass only a surveillance control signal contained in electric signals distributed by said first power distributor, an antenna sending a downlink electric signal passed through said downlink band pass filter to a portable phone by wireless system and receiving a radio signal from said portable phone, a demodulator for surveillance controlling signal to demodulate a signal from said band pass filter for surveillance control signal, a second surveillance controlling unit in which a surveillance control signal from said demodulator for surveillance control signal is inputted, respective parts of said fixed relay station are monitored, and the surveillance signal is outputted, a modulator modulating said surveillance signal, a receiving uplink band pass filter to pass only radio signal—received with said antenna—from said portable phone, a first power multiplexer multiplexing an uplink electric signal passed through said relaying uplink band pass filter a radio signal passed through said receiving uplink band pass filter, and an electric signal modulated by said modulator for surveillance signal, and a second electric/optical converter converting said multiplexed electric signal to an optical signal to output to said uplink optical fiber line.

13. An optical conversion relay amplification system having a fixed central station to transmit/receive a signal to/from a public network and a plurality of fixed relay station located in an intermediate position of a downlink optical fiber line from said fixed central station and an uplink optical fiber line to said fixed central station, wherein said fixed central station is a fixed central station having a modulator for a surveillance control signal modulating a surveillance control signal to control surveillance in said fixed relay station, a high frequency modulator modulating a signal received from said public network to yield a high frequency signal, a second power multiplexer multiplexing an electric signal modulated by said modulator for a surveillance control signal with an electric signal modulated by said high frequency modulator, a first electric/optical converter converting said multiplexed electric signal to an optical signal to output to said downlink optical fiber line, first optical/electric converter converting an optical signal inputted from said uplink optical fiber line to an electric signal, and a second power distributor distributing an electric signal converted by said first optical/electric converter, a band pass filter for surveillance signal to pass only surveillance signal—contained in electric signals distributed by said second power distributor—as a result of surveillance in said fixed relay station, a demodulator for surveillance signal demodulating a signal passed through said band pass filter for surveillance signal to receive a surveillance signal, a transmitting uplink band pass filter to pass only a signal—contained in electric signals distributed by said second power distributor—for said public network, a high frequency demodulator demodulating a signal passed through said transmitting uplink band pass filter to output to said public network, and said fixed relay station is a fixed relay station having an optical branching device in which an optical signal branches from said downlink optical fiber line, an optical multiplexer multiplexing an optical signal branched in said optical branching device with said uplink optical fiber line, a second optical/electric converter—located in upstream of an uplink optical fiber line to which said optical multiplexer fitted—converting an optical signal to an electric signal, a first power distributor distributing said converted electric signal, a relay uplink band pass filter to pass only an uplink electric signal contained in electric signals distributed by said first power distributor, a downlink band pass filter to pass only a downlink electric signal contained in electric signals distributed by said first power distributor, a band pass filter for surveillance control signal to pass only a surveillance control signal contained in electric signals distributed by said first power distributor, an antenna sending a downlink electric signal passed through said downlink band pass filter to a portable phone by wireless system and receiving a radio signal from said portable phone, a second demodulator demodulating a signal passed through said band pass filter for surveillance control signal, a second surveillance controlling unit in which a surveillance control signal second demodulator is inputted, respective parts of said fixed relay station are monitored, and the surveillance signal is outputted, a modulator—for said surveillance control signal—modulating said surveillance signal, a receiving uplink band pass filter to pass only radio signal—received with said antenna—from said portable phone, a first power multiplexer multiplexing an uplink electric signal passed through said relaying uplink band pass filter, a radio signal passed through said receiving uplink band pass filter, and an electric signal modulated by said modulator for surveillance signal, and a second electric/optical converter converting said multiplexed electric signal to an optical signal to output to said uplink optical fiber line.

* * * * *

UNITED STATES PATENT AND TRADEMARK OFFICE
CERTIFICATE OF CORRECTION

PATENT NO. : 6,337,754 B1 Page 1 of 1
DATED : January 8, 2002
INVENTOR(S) : Imajo It is certified that error appears in the above-identified patent and that said Letters Patent is hereby corrected as shown below:

Column 14,
Lines 37-38, delete "band path filter 26" and replace with -- band pass filter 26 --;
Lines 46-47, delete "band path filter 28" and replace with -- band pass filter 28 --;

Column 19,
Line 20, delete "band path filter 26" and replace with -- band pass filter 26 --; and
Lines 20-21, delete "band path filter 28" and replace with -- band pass filter 28 --;

Signed and Sealed this

Twentieth Day of August, 2002

Attest:

JAMES E. ROGAN
Attesting Officer   Director of the United States Patent and Trademark Office